United States Patent

Katoot

[11] Patent Number: 6,146,556
[45] Date of Patent: Nov. 14, 2000

[54] POLYMER ADDITIVES FOR FORMING OBJECTS

[76] Inventor: Mohammad W. Katoot, 1080 Laurian Park Dr., Roswell, Ga. 30075

[21] Appl. No.: 09/069,558

[22] Filed: Apr. 29, 1998

[51] Int. Cl.[7] .......................... C09K 21/02; C09K 21/10; C09K 21/14; C09K 3/10
[52] U.S. Cl. .......................... 252/609; 252/601; 252/602; 106/18; 106/18.12; 106/18.32
[58] Field of Search ................... 252/601, 602, 252/609, 607; 106/18, 18.12, 18.32

[56] References Cited

U.S. PATENT DOCUMENTS

| | | |
|---|---|---|
| 3,884,980 | 5/1975 | Stapfer et al. |
| 3,895,149 | 7/1975 | Sheffler et al. ............. 156/72 |
| 3,932,557 | 1/1976 | Matthews ................. 526/273 |
| 3,941,855 | 3/1976 | Ehrhard ..................... 528/76 |
| 3,985,693 | 10/1976 | Lonning ................... 524/296 |
| 4,013,614 | 3/1977 | Self ......................... 427/426 |
| 4,049,750 | 9/1977 | Brenner ..................... 525/25 |
| 4,267,279 | 5/1981 | Howell ..................... 252/426 |
| 4,267,319 | 5/1981 | Degen ....................... 542/434 |
| 4,287,083 | 9/1981 | McDowell et al. ......... 560/25 |
| 4,293,480 | 10/1981 | Martin et al. ............. 525/456 |
| 4,325,841 | 4/1982 | Howell ...................... 525/17 |
| 4,353,997 | 10/1982 | Keogh ..................... 523/210 |
| 4,469,611 | 9/1984 | Snyder, Jr. et al. ......... 252/75 |
| 4,524,104 | 6/1985 | Hagio et al. ............... 428/341 |
| 4,558,075 | 12/1985 | Suss et al. ................ 523/216 |
| 4,620,994 | 11/1986 | Suss et al. ............... 427/407.1 |
| 4,631,206 | 12/1986 | Mabuchi et al. ........... 427/340 |
| 4,691,045 | 9/1987 | Fukuchi et al. ............ 560/185 |
| 4,699,934 | 10/1987 | Ohkado et al. ............. 523/106 |
| 4,822,849 | 4/1989 | Vanderlaan ................. 525/28 |
| 4,837,401 | 6/1989 | Hirose et al. .............. 525/364 |
| 4,866,148 | 9/1989 | Geyer et al. ............... 526/264 |
| 4,888,413 | 12/1989 | Domb ....................... 528/272 |
| 5,037,858 | 8/1991 | MacDonald ................. 521/38 |
| 5,166,291 | 11/1992 | Atkins et al. ............. 523/508 |
| 5,171,787 | 12/1992 | Zama et al. ............... 525/105 |
| 5,235,008 | 8/1993 | Hefner, Jr. et al. ........ 525/529 |
| 5,250,645 | 10/1993 | Maurer ..................... 526/320 |
| 5,281,634 | 1/1994 | Hesse et al. ............... 523/514 |
| 5,284,705 | 2/1994 | Cahill ..................... 428/328 |
| 5,294,670 | 3/1994 | Hata et al. ................ 525/154 |
| 5,306,739 | 4/1994 | Lucey ....................... 522/42 |
| 5,312,863 | 5/1994 | Van Rheenen et al. ...... 524/555 |
| 5,324,788 | 6/1994 | Kuo ........................ 525/329.5 |
| 5,358,997 | 10/1994 | Rosthauser et al. ......... 524/591 |
| 5,362,800 | 11/1994 | Caramaschi et al. ........ 525/48 |
| 5,369,178 | 11/1994 | Miyazaki et al. .......... 525/155 |
| 5,492,760 | 2/1996 | Sarma et al. .............. 428/378 |
| 5,514,679 | 5/1996 | Adous et al. .............. 514/247 |
| 5,726,240 | 3/1998 | Rosthauser et al. ......... 524/590 |

*Primary Examiner*—Joseph D. Anthony
*Attorney, Agent, or Firm*—Jones & Askew, LLP

[57] ABSTRACT

The present invention relates to flame retardant compositions suitable for use as a cable joint filler. Such flame retardant compositions comprise: at least one oil selected from the group consisting of castor oil, linseed oil and combinations thereof, dibutyltin dilaurate; diphenylmethane diisocyanate; at least one molecular sieve; and at least one filler material selected from the group consisting of calcium carbonate, calcium oxide, sand, and combination thereof.

10 Claims, No Drawings

POLYMER ADDITIVES FOR FORMING OBJECTS

TECHNICAL FIELD

The present invention relates to a polymer concrete comprising conventional resins with certain additives to prevent shrinking and cracking of the resin. The present invention also comprises additives which strengthen objects made from conventional and gel coat resins without significantly increasing their weight. The present invention also comprises objects that are both hard and flexible. More particularly, the present invention relates to polymer concrete that is particularly useful in rapidly casting large objects including poured marble.

BACKGROUND OF THE INVENTION

A plastic is an organic polymer, available as a resin. These resins can be liquid or paste and can be used for embedding, coating, and adhesive bonding; or they can be molded, laminated, or formed into desired shapes, including sheet, film, or larger mass bulk shapes.

The number of basic plastic materials is large and the list is increasing. In addition, the number of variations and modifications to these basic plastic materials is also quite large. Taken together, the resultant quantity of materials available is too large to be completely understood and correctly applied by anyone other than those whose day-to-day work puts them in direct contact with a diverse selection of materials. The practice of mixing brand names, trade names, and chemical names of various plastics only makes the problem of understanding these materials more troublesome. Another variable that makes it difficult for those not versed in plastics to understand and properly design with plastics is the large number of processes by which plastics can be fabricated. Fortunately, there is an organized pattern on which an orderly presentation of these variables can be based. While there are numerous minor classifications for polymers, depending on how one wishes to categorize them, nearly all can be placed into one of two major classifications—thermosetting materials (or thermosets) and thermoplastic materials. Likewise, foams, adhesives, embedding resins, elastomers, and so on, can be subdivided into the thermoplastic and thermosetting classifications. Thermosetting plastics are cured, set, or hardened into a permanent shape.

Curing is an irreversible chemical reaction known as cross-linking, which usually occurs under heat. For some thermosetting materials, curing is initiated or completed at room temperature. Even here, however, it is often the heat of the reaction, or the exotherm, which actually cures the plastic material. Such is the case, for instance, with a room-temperature-curing epoxy or polyester compound. The cross-linking that occurs in the curing reaction is brought about by the linking of atoms between or across two linear polymers, resulting in a three-dimensional rigid chemical structure. Although the cured part can be softened by heat, it cannot be remelted or restored to the flowable state that existed before curing. Continued heating for long times leads to degradation or decomposition.

Thermoplastics differ from thermosets in that they do not cure or set under heat as do thermosets. Thermoplastics merely soften, or melt when heated, to a flowable state, and under pressure they can be forced or transferred from a heated cavity into a cool mold. Upon cooling in a mold, thermoplastics harden and take the shape of the mold. Since thermoplastics do not cure or set, they can be remelted and then rehardened by cooling. Thermal aging, brought about by repeated exposure to the high temperatures required for melting, causes eventual degradation of the material and so limits the number of reheat cycles.

All polymers are formed by the creation of chemical linkages between relatively small molecules, or monomers, to form very large molecules, or polymers. As mentioned, if the chemical linkages form a rigid, cross-linked molecular structure, a thermosetting plastic results. If a somewhat flexible molecular structure with minimal or no cross-linking is formed, either linear or branched, a thermoplastic results.

Polymerization Reactions

Polymerization reactions may occur in a number of ways, with four common techniques being bulk, solution, suspension, and emulsion polymerization. Bulk polymerization involves the reaction of monomers or reactants among themselves, without placing them in some form of extraneous media, as is done in the other types of polymerization.

Solution polymerization is similar to bulk polymerization, except that whereas the solvent for the forming polymer in bulk polymerization is the monomer, the solvent in solution polymerization is usually a chemically inert medium. The solvents used may be complete, partial, or nonsolvents for the growing polymer chains.

Suspension polymerization normally is used only for catalyst-initiated or free radical addition polymerizations. The monomer is dispersed mechanically in a liquid, usually water, which is a nonsolvent for the monomer as well as for all sizes of polymer molecules which form during the reaction. The catalyst initiator is dissolved in the monomer, and it is preferable that it does not dissolve in the water so that it remains with the monomer. The monomer and the polymer being formed from it stay within the beads of organic material dispersed in the phase. Actually, suspension polymerization is essentially a finely divided form of bulk polymerization. The main advantage of suspension polymerization over bulk is that it allows cooling of the exothermic polymerization reaction and maintains closer control over the chain-building process. By controlling the degree of agitation, monomer-to-water ratios, and other variables it is also possible to control the particle size of the finished polymer, thus eliminating the need to reform the material into pellets from a melt, as is usually necessary with bulk polymerization.

Emulsion polymerization is a technique in which addition polymerizations are carried out in a water medium containing an emulsifier (a soap) and a water-soluble initiator. Emulsion polymerization is much more rapid than bulk or solution polymerization at the same temperatures and produces polymers with molecular weights much greater than those obtained at the same rate in bulk polymerizations.

In emulsion polymerization, the monomer diffuses into micelles, which are small spheres of soap film. Polymerization occurs within the micelles. Soap concentration, overall reaction-mass recipe, and reaction conditions can be varied to provide control of the reaction rate and yield.

The usual sequence of processing a thermoplastic is to heat the material so that it softens and flows, force the material in the desired shape through a die or in a mold, and chill the melt into its final shape. By comparison, a thermoset is typically processed by starting out with partially polymerized material, which is softened and activated by heating (either in or out of the mold), forcing it into the desired shape by pressure, and holding it at the curing temperature until final polymerization reaches the point where the part hardens and stiffens sufficiently to keep its shape when demolded.

Plastic-Fabrication Processes and Forms

There are many plastic-fabrication processes, and a wide variety of plastics can be processed by each of these processes or techniques. Fabrication processes can be broadly divided into pressure processes and pressureless or low-pressure processes. Pressureless or low-pressure processes include potting, casting, impregnating, encapsulating, and coating. Pressure processes are usually either thermoplastic-materials processes (such as injection molding, extrusion, and thermoforming) or thermosetting processes (such as compression molding, transfer molding, and laminating).

Compression Molding and Transfer Molding

Compression molding and transfer molding are the two major processes used for forming molded parts from thermosetting raw materials. The two can be carried out in the same type of molding press, but different types of molds are used. The thermosetting materials are normally molded by the compression or transfer process, but it is also possible to mold thermoplastics by these processes since the heated thermoplastics will flow to conform to the mold-cavity shape under suitable pressure. These processes are usually impractical for thermoplastic molding, however, since after the mold cavity is filled to its final shape, the heated mold would have to be cooled to solidify the thermoplastic part. Since repeated heating and cooling of this large mass of metal and the resultant long cycle time per part produced are both objectionable, injection molding is commonly used to process thermoplastics.

Compression Molding

In compression molding, the open mold is placed between the heated platens of the molding press, filled with a given quantity of molding material, and closed under pressure, causing the material to flow into the shape of the mold cavity. The actual pressure required depends on the molding material being used and the geometry of the mold. The mold is kept closed until the plastic material is suitably cured. Then the mold is opened, the part ejected, and the cycle repeated. The mold is usually made of steel with a polished or plated cavity.

The simplest form of compression molding involves the use of a separate self-contained mold or die that is designed for manual handling by the operator. It is loaded on the bench, capped, placed in the press, closed, cured, and then removed for opening under an arbor press. The same mold in most instances (and with some structural modifications) can be mounted permanently into the press and opened and closed as the press itself opens and closes. The press must have a positive up-and down movement under pressure instead of the usual gravity drop found in the standard hand press.

Transfer Molding

The molding material is first placed in a heated pot, separate from the mold cavity. The hot plastic material is then transferred under pressure from the pot through the runners into the closed cavity of the mold.

The advantage of transfer molding lies in the fact that the mold proper is closed at the time the material enters.

Parting lines that might give trouble in finishing are held to a minimum. Inserts are positioned and delicate steel parts of the mold are not subject to movement. Vertical dimensions are more stable than in straight compression. Also, delicate inserts can often be molded by transfer molding, especially with the low-pressure molding compounds.

Injection Molding

Injection molding is the most practical process for molding thermoplastic materials. The operating principle is simple, but the equipment is not.

A material with thermoplastic qualities—one that is viscous at some elevated temperature and stable at room temperature without appreciable deterioration during the cycle—is maintained in a heated reservoir. This hot, soft material is forced from the reservoir into a cool mold. The mold is opened as soon as the material has cooled enough to hold its shape on demolding. The cycle speed is determined by the rapidity with which the temperature of the material used can be reduced, which in turn depends on the thermal conductivity of that material. Acrylics are slow performers, and styrenes are among the fastest.

The machine itself is usually a horizontal cylinder whose bore determines the capacity. Within the bore is a piston which, when retracted, opens a hole in the top of the cylinder through which new material can be added to replace the charge shot into the mold. The cylinder is heated by electric bands which permit temperature variation along its length. Inside the exit end of the cylinder is a torpedo over which the hot material is forced just before coming out of the nozzle into the channels leading to the cavities. This gives the material a final churning and ensures thorough heating. The mold opens and closes automatically, and the whole cycle is controlled by timers.

Thermoset Injection Molding

Because of the chemical nature of the plastic materials, injection molding has traditionally been the primary molding method for thermoplastics, and compression and transfer molding have been the primary molding methods for thermosetting plastics. Because of the greater molding cycle speeds and lower molding costs in injection molding, thermoplastics have had a substantial molding cost advantage over thermosets. As a result, advances in equipment and in thermosetting molding compounds have resulted in a rapid transition to screw-injection, in-line molding. This has been especially prominent with phenolics, but other thermosets are also included to varying degrees. The growth in screw-injection molding of phenolics has been extremely rapid. The development of this technique allows the molder to automate further, reduce labor costs, improve quality, reduce rejects, and gain substantially overall molding cycle efficiency.

Extrusion and Pultrusion

The process of extrusion consists basically of forcing heated, melted plastic continuously through a die, which has an opening shaped to produce a desired finished cross section. Normally it is used for processing thermoplastic materials, but it can also be used for processing thermosetting materials. The main application of extrusion is the production of continuous lengths of film, sheeting, pipe, filaments, wire jacketing, and other useful forms and cross sections. After the plastic melt has been extruded through the die, the extruded material is hardened by cooling, usually by air or water.

Extruded thermosetting materials are used increasingly in wire and cable coverings. The main object here is the production of shapes, parts, and tolerances not obtainable in compression or transfer molding. Pultrusion is a special, increasingly used technique for pulling resin soaked fibers through an orifice, as it offers significant strength improvements. Any thermoset, granular molding compound can be extruded and almost any type of filler may be added to the compound. In fiber-filled compounds, the length of fiber is limited only by the cross-sectional thickness of the extruded piece.

A metered volume of molding compound is fed into the die feed zone, where it is slightly warmed. As the ram forces the compound through the die, the compound is heated gradually until it becomes semi-fluid. Before leaving the die, the extruded part is cured by controlling the time it takes to travel through a zone of increasing temperature. The cured material exits from the die at temperatures of 300 to 350° F. and at variable rates.

Thermosetting Plastics

Plastic materials included in the thermosetting plastic category are alkyds, diallyl phthalates, epoxies, melamines, phenolics, polyesters, silicones, and ureas. In general, unfilled thermosetting plastics tend to be harder, more brittle, and not as tough as thermoplastics. Thus, it is common practice to add fillers to thermosetting materials. A wide variety of fillers can be used for varying product properties. For molded products, usually compression or transfer molding, mineral or cellulose fillers are often used as lower-cost, general-purpose fillers, and glass fiber fillers are often used for optimum strength or dimensional stability. It should be added that filler form and filler surface treatment can also be major variables. Thus it is important to consider fillers along with the thermosetting material, especially for molded products. Other product forms may be filled or unfilled, depending on requirements.

Alkyds

Alkyds are available in granular, rope, and putty form, some suitable for molding at relatively low pressures, and at temperatures in the range of 300 to 400° F. They are formulated from polyester-type resins. Other possible monomers, aside from styrene, are diallyl phthalate and methyl methacrylate. Alkyd compounds are chemically similar to the polyester compounds but make use of higher-viscosity, or dry, monomers. Alkyd compounds often contain glass-fiber filler but may, for example, include clay, calcium carbonate, or alumina.

These unsaturated resins are produced through the reaction of an organic alcohol with an organic acid. The selection of suitable polyfunctional alcohols and acids permits selection of a large variation of repeating units. Formulating can provide resins that demonstrate a wide range of characteristics involving flexibility, heat resistance, chemical resistance, and electrical properties.

Diallyl Phthalates (Allyls)

Diallyl phthalates, or allyls, are among the best of the thermosetting plastics with respect to high insulation resistance and low electrical losses, which are maintained up to 400° F. or higher, and in the presence of high humidity environments. Also, diallyl phthalate resins are easily molded and fabricated.

There are several chemical variations of diallyl phthalate resins, but the two most commonly used are diallyl phthalate (DAP) and diallyl isophthalate (DAIP). The primary application difference is that DAIP will withstand somewhat higher temperatures than will DAP.

DAPs are extremely stable, having very low after-shrinkage, on the order of 0.1 percent. The ultimate in electrical properties is obtained by the use of the synthetic-fiber fillers. However, these materials are expensive, have high mold shrinkage, and have a strong, flexible flash that is extremely difficult to remove from the parts.

Epoxies

Epoxy resins are characterized by the epoxide group (oxirane rings). The most widely used resins are diglycidyl ethers of bisphenol A. These are made by reacting epichlorohydrin with bisphenol A in the presence of an alkaline catalyst. By controlling operating conditions and varying the ratio of epichlorohydrin to bisphenol A, products of different molecular weights can be made.

Another class of epoxy resins is the novolacs, particularly the epoxy cresols and the epoxy phenol novolacs.

These are produced by reacting a novolac resin, usually formed by the reaction of o-cresol or phenol and formaldehyde with epichlorohydrin. These highly functional materials are particularly recommended for transfer-molding powders, electrical laminates, and parts where superior thermal properties, high resistance to solvents and chemicals, and high reactivity with hardeners are needed.

Another group of epoxy resins, the cycloaliphatics, is particularly important when superior arc-track and weathering resistance are necessary requirements. A distinguishing feature of cycloaliphatic resins is the location of the epoxy group(s) on a ring structure rather than on, the aliphatic chain. Cycloaliphatics can be produced by the peracetic epoxidation of cyclic olefins and by the condensation of an acid such as tetrahydrophthalic anhydride with epichlorohydrin, followed by dehydrohalogenation.

Epoxy resins must be cured with cross-linking agents (hardeners) or catalysts to develop desirable properties. The epoxy and hydroxyl groups are the reaction sites through which cross-linking occurs. Useful agents include amines, anhydrides, aldehyde condensation products, and Lewis acid catalysts. Careful selection of the proper curing agent is required to achieve a balance of application properties and initial handling characteristics.

Aliphatic amine curing agents produce a resin-curing agent mixture which has a relatively short working life, but which cures at room temperature or at low baking temperatures in relatively short time. Resins cured with aliphatic amines usually develop the highest exothermic temperatures during the curing reaction; thus the amount of material which can be cured at one time is limited because of possible cracking, crazing, or even charring of the resin system if too large a mass is mixed and cured. Also, physical and electrical properties of epoxy resins cured with aliphatic amines tend to degrade as the operating temperature increases. Epoxies cured with aliphatic amines find their greatest usefulness where small masses can be used, where room-temperature curing is desirable, and where the operating temperature required is below 100° C.

Epoxies cured with aromatic amines have a considerably longer working life than do those cured with aliphatic amines, but they require curing at 100° C. or higher. Resins cured with aromatic amines can operate at a temperature considerably above the temperature necessary for those cured with aliphatic amines. However, aromatic amines are not so easy to work with as aliphatic amines, because of the solid nature of the curing agents and that some (such as metaphenylene diamine) sublime when heated, causing stains and residue deposition.

Catalytic curing agents also have longer working lives than the aliphatic amine materials, and like the aromatic amines, catalytic curing agents normally require curing of the epoxy system at 100° C. or above. Resins cured with these systems have good high-temperature properties as compared with epoxies cured with aliphatic amines. With some of the catalytic curing agents, the exothermic reaction becomes high as the mass of the resin mixture increases.

Acid anhydride curing agents are particularly important for epoxy resins, especially the liquid anhydrides. The high-temperature properties of resin systems cured with these materials are better than those of resin systems cured with aromatic amines. Some anhydride-cured epoxy-resin systems retain most electrical properties to 150° C. and higher, and are not affected physically, even after prolonged heat aging at 200° C. In addition, the liquid anhydrides are extremely easy to work with in that they blend easily with the resins and reduce the viscosity of the resin system. Also, the working life of the liquid acid anhydride systems is comparable with that of mixtures of aliphatic amine and resin, and odors are slight. Amine promoters such as benzyl dimethylamine (BDMA) or DMP-30 are used to promote the curing of mixtures of acid anhydride and epoxy resin.

Epoxies are among the most versatile and most widely used plastics in the electronics field. This is primarily because of the wide variety of formulations possible, and the ease with which these formulations can be made and utilized with minimal equipment requirements. Formulations range from flexible to rigid in the cured state, and from thin liquids to thick pastes and molding powders in the uncured state. Conversion from uncured to cured state is made by use of hardeners or heat, or both. The largest application of epoxies is in embedding applications (potting, casting, encapsulating, and impregnating) in molded parts, and in laminated constructions such as metal-clad laminates for printed circuits and unclad laminates for various types of insulating and terminal boards. Molded parts have excellent dimensional stability.

Melamines and Ureas (Aminos)

As compared with alkyds, diallyl phthalates, and epoxies, which are polymers created by addition reactions and hence have no reaction byproducts, melamines and ureas (also commonly referred to as aminos) are polymers which are formed by condensation reactions and do give off by-products.

Another example of this type of reaction is the polymerization reaction, which produces phenolics. Melamines and ureas are a reaction product of formaldehyde with amino compounds containing $NH_2$ groups. Hence they are often also referred to a melamine formaldehydes and urea formaldehydes.

Amino resins have found applications in the fields of industrial and decorative laminating, adhesives, protective coatings, textile treatment, paper manufacture, and molding compounds. Their clarity permits products to be fabricated in virtually any color. Finished products having an amino-resin surface exhibit excellent resistance to moisture, greases, oils, and solvents; are tasteless and odorless; are self-extinguishing;

offer excellent electrical properties; and resist scratching and marring. The melamine resins offer better chemical, heat, and moisture resistance than do the ureas.

Amino molding compounds can be fabricated by economical molding methods. They are hard, rigid, and abrasion-resistant, and they have high resistance to deformation under load. These materials can be exposed to subzero temperatures without embrittlement. Under tropical conditions, the melamines do not support fungus growth.

Amino materials are self-extinguishing and have excellent electrical insulation characteristics. They are unaffected by common organic solvents, greases and oils, and weak acids and alkalies. Melamines are superior to ureas in resistance to acids, alkalies, heat, and boiling water, and are preferred for applications involving cycling between wet and dry conditions or rough handling. Aminos do not impart taste or odor to foods.

Addition of alpha cellulose filler, the most commonly used filler for aminos, produces an unlimited range of light-stable colors and high degrees of translucency. Colors are obtained without sacrifice of basic material properties.

Shrinkage characteristics with cellulose filler are a major problem.

Melamines and ureas provide excellent heat insulation; temperatures up to the destruction point will not cause parts to lose their shape. Amino resins exhibit relatively high mold shrinkage, and also shrink on aging. Cracks develop in urea moldings subjected to severe cycling between dry and wet conditions. Prolonged exposure to high temperature affects the color of both urea and melamine products.

A loss of certain strength characteristics also occurs when amino moldings are subjected to prolonged elevated temperatures. Some electrical characteristics are also adversely affected; the arc resistance of some industrial types, however, remains unaffected after exposure at 500° F.

Ureas are unsuitable for outdoor exposure. Melamines experience little degradation in electrical or physical properties after outdoor exposure, but color changes may occur.

Phenolics

Like melamines and ureas, phenolic resin precursors are formed by a condensation reaction. Phenolics are among the oldest, best-known general-purpose molding materials. They are also among the lowest in cost and the easiest to mold. An extremely large number of phenolic materials are available, based on the many resin and filler combinations, and they can be classified in many ways. One common way of classifying them is by type of application or grade. In addition to molding materials, phenolics are used to bond friction materials for automotive brake linings, clutch parts, and transmission bands. They serve as binders for wood-particle board used in building panels and core material for furniture, as the water-resistant adhesive for exterior-grade plywood, and as the bonding agent for converting both organic and inorganic fibers into acoustical- and thermal insulation pads, batts, or cushioning for home, industrial, and automotive applications. They are used to impregnate paper for electrical or decorative laminates and as special additives to tackify, plasticize, reinforce, or harden a variety of elastomers.

Although it is possible to obtain various molding grades of phenolics for various applications, as discussed, phenolics, generally speaking, are not equivalent to diallyl phthalates and epoxies in resistance to humidity and retention of electrical properties in extreme environments. Phenolics are, however, quite adequate for a large percentage of electrical applications. Grades have been developed which yield considerable improvements in humid environments and at higher temperatures. The glass-filled, heat-resistant grades are outstanding in thermal stability up to 400° F. and higher, with some being useful up to 500° F. Shrinkage in heat aging varies over a fairly wide range, depending on the filler used.

Polybutadienes

Polybutadiene polymers that vary in 1,2 microstructure from 60 to 90 percent offer potential as moldings, laminating resins, coatings, and cast liquid and formed-sheet products. These materials, being essentially pure hydrocarbon, have outstanding electrical and thermal stability properties.

Polybutadienes are cured by peroxide catalysts, which produce carbon-to carbon bonds at the double bonds in the vinyl groups. The final product is 100 percent hydrocarbon except where the starting polymer is the —OH or —COOH terminated variety. The nature of the resultant product may be more readily understood if the structure is regarded as polyethylene with a cross-link at every other carbon in the main chain.

Use of the high-temperature peroxides maximizes the opportunity for thermoplastic-like processing, because even the higher-molecular-weight forms become quite fluid at temperatures well below the cure temperature. Compounds can be injection-molded in an in-line machine with a thermoplastic screw.

Polyesters (Thermosetting)

Unsaturated, thermosetting polyesters are produced by addition polymerization reactions. Polyester resins can be formulated to have a range of physical properties from brittle and hard to tough and resistant to soft and flexible. Viscosities at room temperature may range from 50 to more than 25,000 centipoise (cP). Polyesters can be used to fabricate a myriad of products by many techniques, including but not limited to, open-mold casting, hand lay-up, spray-up, vacuum-bag molding, matched-metal-die molding, filament winding, pultrusion, encapsulation, centrifugal casting, and injection molding.

By the appropriate choice of ingredients, particularly to form the linear polyester resin, special properties can be imparted. Fire retardance can be achieved through the use of one or more of the following: chlorendic anhydride, aluminum trihydrite, tetrabromophthalic anhydride, tetrachlorophthalic anhydride, dibromoneopentyl glycol, and chlorostyrene. Chemical resistance is obtained by using neopentyl glycol, isophthalic acid, hydrogenated bisphenol A, and trimethyl pentanediol. Weathering resistance can be enhanced by the use of neopentyl glycol and methyl methacrylate. Appropriate thermoplastic polymers can be added to reduce or eliminate shrinkage during curing and thereby minimize one of the disadvantages historically inherent in polyester systems.

Thermosetting polyesters are widely used for moldings, laminated or reinforced structures, surface gel coatings, liquid castings, furniture products, fiberglass parts, and structures such as boats, including but not limited to sailboats, motor boats, and fishing boats; other motor vehicles such as automobiles, trains, motorcycles, trucks, and airplanes; gliders, sleds, and bathroom and kitchen components. Cast products include furniture, bowling balls, simulated marble, gaskets for vitrified-clay sewer pipe, pistol grips, pearlescent shirt buttons, and implosion barriers for television tubes.

By lay-up and spray-up techniques large- and short-run items are fabricated. Examples include boats of all kinds, such as pleasure sailboats and powered yachts, commercial fishing boats and shrimp trawlers, small military vessels, dune buggies, all-terrain vehicles, custom auto bodies, truck cabs, horse trailers, motor homes, housing modules, concrete forms, and playground equipment.

Molding is also performed with premix compounds, which are dough-like materials generally prepared by the molder shortly before they are to be molded by combining the premix constituents in a sigma-blade mixer or similar equipment. Premix, using conventional polyester resins, is used to mold automotive-heater housings and air-conditioner components. Low-shrinkage resin systems permit the fabrication of exterior automotive components such as fender extensions, lamp housings, hood scoops, and trim rails.

Wet molding of glass mats or preforms is used to fabricate such items as snack-table tops, food trays, tote boxes, and stackable chairs. Corrugated and flat paneling for room dividers, roofing and siding, awnings, skylights, fences, and the like is a very important outlet for polyesters.

Pultrusion techniques are used to make fishing-rod stock and profiles from which slatted benches and ladders can be fabricated. Chemical storage tanks are made by filament winding.

Silicones

Silicones are a family of unique synthetic polymers, which are partly organic and partly inorganic. They have a quartzlike polymer structure, being made up of alternating silicon and oxygen atoms rather than the carbon-to-carbon backbone, which is a characteristic of the organic polymers. Silicones have outstanding thermal stability.

Typically, the silicon atoms will have one or more organic side groups attached to them, generally phenyl ($C_6H_5$—), methyl ($CH_3$—), or vinyl ($CH_2$=CH—) units. Other alkyd aryl, and reactive organic groups on the silicon atom are also possible. These groups impart characteristics such as solvent resistance, lubricity and compatibility, and reactivity with organic chemicals and polymers.

Silicone polymers may be filled or unfilled, depending on properties desired and application. They can be cured by several mechanisms, either at room temperature [by room-temperature vulcanization (RTV)] or at elevated temperatures. Their final form may be fluid, gel, elastomeric, or rigid.

Some of the properties which distinguish silicone polymers from their organic counterparts are (1) relatively uniform properties over a wide temperature range, (2) low surface tension, (3) high degree of slip or lubricity, (4) excellent release properties, (5) extreme water repellency, (6) excellent electrical properties over a wide range of temperatures and frequencies, (7) inertness and compatibility, both physiologically and in electronic applications, (8) chemical inertness, and (9) weather resistance.

Flexible two-part, solvent-free silicone resins are available in filled and unfilled forms. Their viscosities range from 3000 cP to viscous thixotropic fluids of greater than 50,000 cP. The polymer base for these resins is primarily dimethylpolysiloxane. Some vinyl and hydrogen groups attached to silicon are also present as part of the polymer.

These products are cured at room or slightly elevated temperatures. During cure there is little if any exotherm, and there are no by-products from the cure. The flexible resins have Shore A hardness values of 0 to 60 and Bashore resiliencies of 0 to 80. Flexibility can be retained from −55° C. or lower to 250° C. or higher.

Flexible resins find extensive use in electrical and electronic applications where stable dielectric properties and resistance to harsh environments are important. They are also used in many industries to make rubber molds and patterns.

Rigid silicone resins exist as solvent solutions or as solvent-free solids. The most significant uses of these resins are as paint intermediates to upgrade thermal and weathering characteristics of organic coatings, as electrical varnishes, glass tape, and circuit-board coatings.

Glass cloth, asbestos, and mica laminates are prepared with silicone resins for a variety of electrical applications. Laminated parts can be molded under high or low pressures, vacuum-bag-molded, or filament-wound.

Thermosetting molding compounds made with silicone resins as the binder are finding wide application in the electronic industry as encapsulants for semiconductor devices. Inertness toward devices, stable electrical and thermal properties, and self-extinguishing characteristics are important reasons for their use.

Similar molding compounds, containing refractory fillers, can be molded on conventional thermoset equipment. Molded parts are then fired to yield a ceramic article. High-impact, long-glass-fiber-filled molding compounds are also available for use in high-temperature structural applications.

In general, silicone resins and composites made with silicone resins exhibit outstanding long-term thermal stabilities at temperatures approaching 300° C., and excellent moisture resistance and electrical properties.

All of the conventional plastics shrink and/or crack to some degree when molded into large objects. To avoid these problems, elaborate curing schemes often have to be implemented which, in some cases, takes time and specialized equipment. What is needed is an additive or additives that will inhibit cracking and shrinkage and allow the rapid casting of large objects from a variety of prior art resins. What is also needed are additives that will strengthen objects made from conventional and gel coat resins without significantly increasing their weight.

SUMMARY OF THE INVENTION

The present invention comprises novel resin polymer additives which can be used to cast large objects in a short time with substantially no shrinkage or cracking, and without the use of specialized equipment or special curing environments such as heating. The additives of the present invention can be used in a wide variety of conventional resins and also with gel coat resins.

The present invention comprises additives that impart non-shrinking properties and non-cracking properties to a wide variety of conventional resins. The additives can be added to resins and by adjusting the concentration of certain components of the additives, the rate of curing can be controlled without accompanying side effects such as shrinkage or cracking.

One of the non-shrinking formulations is a mixture comprising an aldehyde, a glycol, a perchlorate and a metal chloride. In one preferred embodiment, this non-shrinking formulation is a mixture comprising formaldehyde, ethylene glycol, copper perchlorate and copper chloride.

A second, non-shrinking formulation is an admixture comprising a peroxide or an azo compound, a methacrylate or acrylate monomer, and N-methylpyrrolidinone. In one preferred embodiment, this second, non-shrinking formulation is an admixture comprising benzoyl peroxide, methyl methacrylate and N-methylpyrrolidinone.

The present invention further comprises a non-cracking formulation containing N-butyl mercaptan and a halogenated compound, such as tetraethylammonium bromide, or various chain-transfer agents.

The present invention further comprises another additive comprising a formulation which is a hardener solution that may be added to conventional resins and to gel coat resins to increase the strength of the objects made from these resins. The hardener solution is made by dissolving dibenzoyl peroxide to saturation in about 50 ml of methylmethacrylate on a cold water bath. An equal volume of styrene is added and mixed. Other monomers containing styrene, and other strong peroxides may be used in the practice of this invention.

Optionally, butanethiol (0.25%), preferably 1-butanethiol, may be added to the mix. Other methacrylate monomers and acrylate monomers such as those in Table I may also be used in the practice of this invention.

The present invention further comprises another formulation which may be used to increase the strength of conventional resins and gel coat resins through the addition of different amounts of a solution of carboxymethylcellulose (CMC) solution made by first saturating CMC powder in methanol followed by the addition of water and other ingredients. By increasing the amount of CMC solution added to conventional resins and gel coat resins, the strength of the object made form these resins increases without significant increases in the weight of the object.

The various formulations can be used in combination or singly depending upon the resin and filler to which the formulations are to be added. Preferably, all three formulations are added to the resin before casting the large object.

The present invention also comprises a filler in the form of binders and polar polymer gels that are treated with a polar solvent.

The present invention also comprises a method of pretreating glass fiber before it is incorporated into a polymer resin to add strength to the resin. The pretreated glass fiber comprises conventional fiberglass that has been treated with a surfactant or dispersant formulation such as dodecyl benzene sulfonic acid or any other ionic surfactant. The dodecyl benzene sulfonic acid is dissolved in water and then the volume is increased with ethylene glycol at a ratio of approximately 10% to 90% ethylene glycol to approximately 10% to 90% of the aqueous solution of dodecyl benzene sulfonic acid.

Another embodiment of the present invention provides a substantially non-flammable prepolymer resin that can be used to cast objects.

Accordingly, it is an object of the present invention to provide additives to conventional resins which impart the desirable characteristics of non-shrinkage and non-cracking when casting the resin, with the addition of treated fillers as described above.

It is another object of the present invention to provide novel additives and resin compositions that can rapidly be cast into objects including large objects without shrinking or cracking.

It is another object of the present invention to provide novel additives that may be used to increase the strength of objects made from conventional resins and gel coat resins without significantly increasing the weight of the objects.

It is yet another object of the present invention to provide a novel method of pouring or casting large objects from polymer resins.

It is yet another object of the present invention to provide a novel method of manufacturing large objects from polymer resins that are fire-resistant.

Another object of the present invention is to provide methods and compositions that can be used in the construction industry.

It is another object of the present invention to provide a method and composition for casting cultured marble.

It is another object of the present invention to provide a prepolymer solution that is substantially non-flammable.

Another object of the present invention is to provide additives for use in casting cultured marble which impart the desirable characteristics of non-shrinkage and non-cracking when casting the marble, and significantly accelerate the process of casting the marble.

Another object of the present invention is to provide methods and materials for rapidly casting objects that are hard, exhibit high resistance to breakage, and are flexible.

These and other objects, features and advantages of the present invention will become apparent after a review of the following detailed description of the disclosed embodiments.

DETAILED DESCRIPTION

The present invention comprises a polymer resin that can be rapidly cast with substantially no shrinkage or cracking. The polymer resin of the present invention can be cast into a variety of objects, including large objects, without special curing conditions. The polymer resin is especially useful in casting large building elements such as blocks, pavers, shingles, roofs, floors, siding, stairs, bricks, pilings, bridges, sea retaining walls, piers, docks, foundations, beams, walls, including structural walls and sound walls, and the like. The present invention may also be used to cast modular units such as apartments, houses, portable homes, jail cells, rooms, basements, storage sheds, classrooms, portable schools, portable offices, and hazardous materials and hazardous chemicals storage cabinets and buildings. The present invention may also be used to cast toys, playgrounds, swing sets, jungle gyms, and other items used by children The methods and compositions of the present invention may be used to make objects used in the construction industry. For example, foundations, pilings, walls, floors, tiles, wall tiles, floor tiles, paneling, sinks, kitchen counter tops, cabinets, laboratory counter and bench tops, table tops, basins, pedestal wash basins, bidets, toilets, urinals, showers, shower stalls, tubs, bathtubs, Jacuzzis, hot tubs, whirlpools, vanity tops, wall surrounds, decorator mirror frames, soap dishes, and towel bars may all be made as well as other hard surfaces. Plumbing materials including, but not limited to, pipes, sewer pipes, manholes, manhole covers, storage tanks, couplings, joints, fixtures, knobs, showerheads, faucets, drains, water pipes, water mains, and fountains may all be manufactured with the present invention. Houses may be constructed rapidly and at reduced cost in geographic areas deficient in traditional building materials such as timber. Apartment units may be cast rapidly in modular form and assembled quickly into buildings.

Drainage systems, culverts, driveways, curbs, walkways, sidewalks, and many other objects typically made from concrete may be made with the methods and compositions of the present invention. Components of bridges and other reinforced structures may be constructed from the present invention due to the strength of these novel materials. Railroad ties, poles for streetlights, poles for traffic lights, poles for street signs, telephone poles, poles and structural elements for transmission systems, electrical manholes, high voltage lines, communication towers, docks, decks, piers, sea retaining walls, breakwaters, jetties, and other objects made from timber, concrete and/or steel may be made more economically and rapidly with the methods and materials of the present invention.

In addition to forming many of the objects listed above, it is to be understood that the present invention may be used to place a protective coating around or on the surface of many of these objects. For example, in one embodiment of the present invention, existing shipping pilings may be encapsulated or coated with the composition of the present invention to increase strength and longevity, and to decrease the need for routine maintenance such as painting. By encapsulating or coating the surfaces of structural elements of objects, structural integrity may be preserved for a longer period of time before replacement is necessary. For example, in another embodiment of the present invention, steel and/or concrete components of bridges may be coated with the compositions of the present invention in order to retard corrosion from sources such as environmental pollutants and salt water, thereby extending the useful life of the bridge. Since the compositions of the present invention are corrosion resistant and may be colored consistently throughout, coating an object such as a bridge would decrease or eliminate the need for expensive, laborious and lengthy routine maintenance and painting. Other objects that may receive coatings of the present invention include, but are not limited to, siding, shingles, slate, tile, sound walls, sea walls, docks, jetties, breakwaters, tunnels, ship hulls, poles including telephone poles and light poles, transmission towers for communication and power lines, as well as other objects mentioned elsewhere in the present application.

A wide variety of cooking and kitchen objects may be made with the compositions and methods of the present invention including cookware, plates, utensils, glasses, and baking devices.

The present inventions include novel compositions comprising conventional resins, including, but not limited to, epoxies, polyesters, polyurethanes, flexible silicones, rigid silicones, polybutadienes, polysulfides, depolymerized rubber and allylic resins. Polyesters that can be used in the present invention include polyesters containing one or more monomers including, but are not limited to, alpha methyl styrene, methyl methacrylate, vinyl toluene, diallyl phthalate, triallyl cyanurate, divinyl benzene, and chlorostyrene.

Initiators for curing the resins include, but are not limited to, peroxides such as benzoyl peroxide, methyl ethyl ketone peroxide (also called 2-butanone peroxide), hydrogen peroxide, and dibenzoyl peroxide. Other initiators that may be used in the present invention include azo compounds. Polyaniline in N-methylpyrrolidinone may also be used as an initiator in some formulations.

Catalysts include, but are not limited to, cobalt II acetate, cobalt II naphthanate, methylene II acetate, chromium II acetate, copper II acetate, calcium oxide, N,N-dimethylaniline, and 3,5-dimethylaniline, can be used in the present invention. Diethylamines, triethylamines and other amine-containing catalysts may also be used in the present invention. Catalysts are dissolved in any suitable solvent including, but not limited to, solvents such as styrene, water, or alcohol. The catalysts that can be used in the present invention are well known to those of ordinary skill in the art. (See *Handbook of Plastics Elastomers and Composites*, Harper, C. A., editor, McGraw-Hill, 1992 which is incorporated by reference).

Fillers can be used with the present invention in the form of powders, fibers, flakes, and liquids, for example, tar. Fillers are used to modify viscosity, increase pot life, reduce exotherm, modify density, improve heat resistance, modify thermal conductivity (usually to increase thermal conductivity), increase strength, improve machineability, increase hardness and wear resistance, modify electrical properties, increase chemical and solvent resistance, modify friction characteristics, improve thermal shock resistance, improve adhesion, and impart color.

Generally the fillers should be low in cost, reproducible in composition, particle size, and shape, easy to disperse in the compound, and low in density, and they should not increase the viscosity of the mixture excessively. The filler should stay in suspension or be able to be resuspended with a minimum of stirring. Fillers that can be used in the present invention include, but are not limited to, silica, calcium carbonate, clays, aluminum hydroxide, titanium dioxide, calcium silicate, aluminum trihydride, glass spheres, hollow spheres, fibers including glass, asbestos, DACRON™, cotton, and nylon, metal powders and particles, powders, sand, soil, fly ash, pigments, carpet and fragments thereof, saw dust, and stone.

The present invention is also directed to reactant fillers. Desirably, the reactant fillers are uniformly distributed in the above-described resins. Preferably, the reactant fillers are pretreated with (1) a hydroxyl group (e.g., an alcohol such as ethyl alcohol), or diluted polar solvents or polar polymers such as carboxymethylcellulose (CMC), or a compound containing a functional carbonyl group (e.g., an organic acid such as acetic acid) with slightly acidic pH, and (2) a non-cracking additive formulation (see Example 3). More preferably, the fillers are further treated with the dispersant formulation described in Example 5. In one embodiment, the dispersant formulation comprises an ionic surfactant, such as dodecylbenzene sulfonic acid or its sodium salt, mixed with p-toluene sulfonic acid monohydrate in a ratio of about 1:1. This mixture is then added to ethylene glycol at a ratio of approximately 2 parts ethylene glycol to 1 part of the p-toluene sulfonic acid mixture. The treated filler is then added to the resin in a conventional manner.

The present invention includes additives that can be added to conventional resins, with or without fillers, to impart desired effects of non-shrinkage and non-cracking to cured objects formed from the resins.

One of the additives is a non-shrinking formulation comprising a mixture of an aldehyde, a glycol, a perchlorate and a metal chloride. Suitable aldehydes that may be used in this formulation include, but are not limited to, formaldehyde, paraformaldehyde, and glutaraldehyde. Suitable glycols that may be used in this formulation include, but are not limited to, propylene glycol, ethylene glycol and polymers thereof. Suitable perchlorates that may be used in this formulation include, but are not limited to, copper perchlorate. Suitable metal chlorides that may be used in this formulation include, but are not limited to, copper II chloride, mercuric chloride, magnesium chloride, manganese chloride, nickel chloride, ferric chloride, ferrous chloride, silver chloride, gold chloride, zinc chloride, cadmium chloride, and aluminum chloride. In one preferred embodiment, the non-shrinking formulation comprises a mixture of formaldehyde, ethylene glycol, copper perchlorate and copper chloride. Desirably, the non-shrinking additive comprises formaldehyde (approximately 100 parts), ethylene glycol (approximately 100 parts), copper perchlorate (approximately 10 parts), and copper chloride (approximately 20 parts). Depending upon the resin that is being treated, the composition can vary.

Another additive is a second, non-shrinking formulation which is an admixture comprising a peroxide or an azo compound, a methacrylate or acrylate monomer, and N-methylpyrrolidinone (NMP). Suitable peroxides that may be used in this formulation include, but are not limited to, benzoyl peroxide, hydrogen peroxide, dibenzoyl peroxide and methyl ethyl ketone peroxide. Alternatively, azo compounds may be used instead of peroxide compounds. Suitable methacrylate and acrylate monomers that may be used in this formulation include, but are not limited to, those listed in Table 1 below. In one preferred embodiment, the non-shrinking formulation comprises an admixture of benzoyl peroxide, methyl methacrylate and N-methylpyrrolidinone. In this embodiment, benzoyl peroxide, methyl methacrylate and NMP are present in a weight ratio of approximately 100:50:20.

TABLE I

| Monomer | $n_D$ of polymer |
|---|---|
| methyl methacrylate | 1.49 |
| ethyl methacrylate | 1.483 |
| n-propyl methacrylate | 1.484 |
| n-butyl methacrylate | 1.483 |
| n-hexyl methacrylate | 1.481 |
| isopropyl methacrylate | 1.473 |

TABLE I-continued

| Monomer | $n_D$ of polymer |
|---|---|
| isobutyl methacrylate | 1.477 |
| tert-butyl methacrylate | 1.463 |
| cyclohexyl methacrylate | 1.507 |
| benzyl methacrylate | 1.568 |
| phenyl methacrylate | 1.57 |
| 1-phenylethyl methacrylate | 1.549 |
| 2-phenylethyl methacrylate | 1.559 |
| furfuryl methacrylate | 1.538 |
| methyl acrylate | 1.4725 |
| ethyl acrylate | 1.4685 |
| n-butyl acrylate | 1.4634 |
| benzyl acrylate | 1.5584 |
| 2-chloroethyl acrylate | 1.52 |
| vinyl acetate | 1.47 |
| vinyl benzoate | 1.578 |
| vinyl phenylacetate | 1.567 |
| vinyl chloroacetate | 1.512 |
| acrylonitrile | 1.52 |
| a-methylacrylonitrile | 1.52 |
| methyl-a-chloroacrylate | 1.5172 |
| atropic acid, methyl ester | 1.560 |
| o-chlorostyrene | 1.6098 |
| p-fluorostyrene | 1.566 |
| o, p-difluorostyrene | 1.475 |
| pentabromophenylacrylate | 1.7 |
| pentachlorophenyl methacrylate | 1.63 |
| pentabromophenylmethacrylate | 1.71 |
| chlorophenylacrylate | 1.5 |
| benzylmethacrylate | 1.56 |
| 2,4,6 tribromophenylacrylate | 1.6 |
| α, ω, dichloropropyl-dimethylsiloxane | 1.42 |
| p-isopropyl styrene | 1.554 |
| 2,2,2-trifluoroethylacrylate | 1.37 |
| 2,2,2-trifluoroethylmethacrylate | 1.39 |
| tribromoneopentylmethacrylate | 1.6 |

The present invention further comprises a non-cracking additive containing N-butyl mercaptan and a halogenated compound, such as tetraethylammonium bromide (TEAB). Alternatively, various chain-transfer agents may be used instead of the TEAB. Suitable chain-transfer agents include, but are not limited to, acetic acid, acetone, benzene, n-butyl alcohol, isobutyl alcohol, sec-butyl alcohol, tert-butyl alcohol, n-butyl chloride, n-butyl iodide, tert-butyl mercaptan, carbon tetrabromide, carbon tetrachloride, chlorobenzene, chloroform, diethyl ketone, diethyl dithioglycolate, diethyl disulfide, dioxane, diphenyl disulfide, dodecyl mercaptan, ethyl acetate, ethylbenzene, ethylene dibromide, ethylene dichloride, ethyl thioglycolate, mercaptoethanol, methyl isobutyl ketone, methylcyclohexane, methyl isobutyrate, methylene chloride, methyl ethyl ketone, pentaphenylethane, propylene chloride, isopropylbenzene, isopropyl mercaptan, tetrachloroethane, thio-g-naphthol, thiophenol, toluene and triphenylmethane. In one embodiment, N-butyl mercaptan and TEAB are mixed together at a ratio of approximately 100 parts N-butyl mercaptan to 1 part TEAB by weight. This additive may be combined with one or more of the other additives disclosed above in the practice of the present invention.

The various formulations can be used in combination or singly depending upon the resin and filler to which the formulations are to be added. In general terms, one embodiment of the present invention provides a preferred method of making objects comprising treating fillers with polar solvents or polar polymers and a dispersant formulation; mixing the treated fillers with resin; adding ethylene glycol and styrene; adding in any order the three additives A, B, and C, described in Examples 1, 2, and 3; adding catalyst and dimethylaniline; and adding initiator.

Typically, additives A, B and C are added at a concentration of between about 0.1 to 4% by weight with a desired concentration of between approximately 0.5% to 2% by weight. It is to be understood that the additives can be used separately or together in the final resin preparation depending upon the desired properties that need to be imparted to the formed object.

The present invention also provides a method for strengthening objects made from resin, and an additive composition which is a hardener solution that may be added to conventional resins and gel coat resins to increase the strength of the objects made from these resins. The hardener solution is made by dissolving dibenzoyl peroxide to saturation in about 50 ml of methylmethacrylate on a cold water bath. An equal volume of styrene is added and mixed. Optionally, butanethiol (0.25%), preferably 1-butanethiol, may be added to the mix. A preferred range of butanethiol that may be used in the present invention is from about 0.02% to 0.25% by weight. Other monomers containing styrene, and other strong peroxides, including, but are not limited to, benzoyl peroxide, hydrogen peroxide, dibenzoyl peroxide, methyl ethyl ketone peroxide, 2,5-di-methyl-2,5-bis(2-ethyl hexyl peroxy)hexane, t-butyl peroxyoctoate, lauroyl peroxide, t-butyl perbenzoate and t-amyl peroxides, may be used in the practice of this invention. Other methacrylate monomers and acrylate monomers, such as those in Table I, may also be used in the practice of this invention.

Another method of the present invention that may be used to increase the strength of conventional resins and gel coat resins is the addition of different amounts of a solution of carboxymethylcellulose (CMC) solution made by first saturating CMC powder in methanol or ethanol followed by the addition of water and other ingredients. Heat may optionally be used to accelerate CMC entering solution. By increasing the amount of CMC solution added to conventional resins and gel coat resins, the strength of objects made from these resins increases without significant increases in their weight. Desirable concentration ranges of CMC in aqueous solution are from about 0.1% to 5.0% by weight, with a more preferred concentration range of from 0.25% to 5.0% by weight and a most desired concentration range of from 0.5% to 1% by weight.

Polyaniline may also be used to increase the strength of conventional resins and gel coat resins. Desirable concentration ranges of polyaniline in aqueous solution are from about 0.1% to 5.0% by weight, with a more desired concentration range of from 0.25% to 5.0% by weight, and a most desired concentration range of from 0.5% to 1% by weight. Polyaniline may also be combined with the CMC in solution in a range of polyaniline to CMC from about 10% to 90% by weight.

The present invention also includes cultured marble products. According to the present invention, cultured marble products can be made without the prior art requirements of carefully controlling the curing process to avoid shrinkage and cracking of the final poured product. The cultured marble products made with the present invention may be used in a variety of applications described above. Some preferred applications of the present invention are the production of tiles, paneling, sinks, counter tops, basins, sinks, pedestal wash basins, bidets, table tops, toilets, toilet holders, urinals, showers, tubs, bathtubs, Jacuzzis, hot tubs, whirlpools, couplings, joints, fixtures, soap dishes, towel bars, toilet paper dispensers, knobs, showerheads, faucets, drains, fountains, siding, and surface application to bricks or stone.

The present invention also includes methods and compositions for rapidly making strong but flexible objects. Strong and flexible objects have many uses in a variety of industries. For example, in the transportation industry, bumpers made with one embodiment of the present invention would increase protection to motor vehicles such as automobiles, trucks, and buses. Strong and flexible objects would also be useful as bumpers on the sides of boats, such as sailboats; as bumpers for loading docks for trucks and train cars; as crash guards on the highway; as bumpers on loading docks for boats, ships, trucks, and trains; as protective strips on the sides of motor vehicles; as mud flaps for motor vehicles; as a material for use in the construction of dashboards; as a building material in a geographic area prone to earthquakes; as a building material in areas subject to vibrational stress such as near subways, railroads and highways and near bridges; and as a material for use in construction of playgrounds and recreational facilities, including surfaces of playgrounds, monkey bars, jungle gyms, and swing sets.

In one embodiment of the present invention, flexible objects with high tensile strength may be made by forming a strong, fibrous and flexible resin in the following manner. In this method, a polyaniline is employed. To produce the polyaniline used in the present invention, a prepolymer solution is prepared by mixing about 21 ml of distilled purified aniline with about 300 ml of 1 M HCl. The prepolymer solution is then placed in a three necked flask, purged with nitrogen, and cooled to approximately 5° C. In a separate container, about 12 gm of ammonium persulfate is dissolved in approximately 200 ml of 1 M HCl. The container is purged with pure nitrogen. The ammonium persulfate solution is cooled to about 5° C. and then added to the three necked flask. The mixture is cooled to approximately 0° C. and stirred for about 20 minutes. The temperature of the solution is then raised to from 8° to 10° C. for about 15 minutes. Next, the solution is cooled to approximately 0° C. and stirred for about 45 minutes. The polyaniline precipitate is then washed several times by filtration with distilled water. The polyaniline precipitate is treated with 1 M potassium hydroxide for about 24 hours after which it is filtered, washed again for 6 to 12 hours in distilled $H_2O$, heated, and dried in a vacuum oven for about 24 hours at 50° C. The dried polyaniline is ground into a powder. The mixture may be optionally extracted with a soxhlet extraction with acetonitrile for 3 hours until the extract is no longer colored. This extraction produces a polyaniline powder. The polyaniline is dried in an oven at 50° C. for about 6 to 7 hours and then ground to a powder. It is then treated with 1 M KOH for about 24 hours after which it is filtered, washed again for 6 to 12 hours in distilled $H_2O$ and dried in a vacuum oven for about 24 hours at approximately 50° C. The polyaniline precipitate is then dissolved in a N-methylpyrrolidinone (NMP) to saturation. Different amounts of polyaniline may be added to NMP to achieve a final percentage of from 0.1% by weight of the total mixture to a saturated solution. It is to be understood that pyrrolidone and pyrrolidinone are synonymous as used throughout the present application. Objects made with strong, fibrous and flexible resin may be used in numerous applications requiring superior strength, including but not limited to, sheathing for cables, wires, power lines, transmission lines, communication cables, and fiber optic cable.

A resin mix can be made with the following method. To about 30 ml of polyester resin is added approximately 4–8 ml of styrene, 0.5 to 1 ml N,N-dimethylaniline, 0.5 to 1 ml of cobalt II naphthanate as catalyst, 0.2 to 0.8 ml of the saturated solution of polyaniline in N-methylpyrrolidinone as described above, and about 0.1 to 0.4 ml of an initiator, methyl ethyl ketone peroxide. The resulting resin displays a fibrous matrix which is strong and flexible.

Other hard resin mixes can be made with the following ranges of reagents: vinylester resin, 400–450 gm; N,N-dimethylaniline, 0.25–2 gm; catalyst cobalt II naphthanate, 0.25–2 gm; Solution 4A (Example 16), 3–4 gm; Solution 4B (Example 16), 0.8–3 gm; Solution SC (Example 16), 3–4 gm; and calcium oxide, 2–3 gm. Examples of some of these ranges are presented in Table 5.

It is to be understood that other catalysts, as described in the present application, may be used instead of cobalt II naphthanate in the method described above. Both diethylamine and triethylamine may also be used as catalysts, as well as other amine-containing catalysts. In addition, other resins described in the present application may be used instead of polyester resin, including, but not limited to, vinyl esters and epoxy resins.

In another embodiment of the present invention for making strong flexible materials with fibrous resin, the solution of polyaniline in N-methylpyrrolidinone as described in the preceding embodiment is used without methyl ethyl ketone peroxide. The polyaniline in N-methylpyrrolidinone acts as a slower initiator than the methyl ethyl ketone peroxide. In this embodiment, the addition of methyl ethyl ketone peroxide, from about 0.1% to 2% by weight, is optional and it may be added to accelerate the reaction. The resulting resin displays a fibrous matrix which is strong and flexible.

The present invention also includes blends of resins and glass fiber which exhibit high tensile strength comparable to glass fiber and do not require the laborious and expensive multiple applications of glass fiber layers with lengthy curing times. The pretreated fiber glass comprises conventional glass fiber that has been treated with a surfactant or dispersant formulation such as dodecyl benzene sulfonic acid or any other ionic surfactant. The dodecyl benzene sulfonic acid is dissolved in water and then the volume is increased with ethylene glycol at a weight ratio of approximately 10% to 90% ethylene glycol to approximately 10% to 90% of the aqueous solution of dodecyl benzene sulfonic acid. Desirably, glass fiber is pretreated before it is incorporated into a polymer resin to add strength to the resin. After wetting the glass fiber with the surfactant, about 5 gm of pretreated glass fiber and about 400 ml of surfactant are mixed in a high speed blender until single fibers are apparent. This embodiment of the present invention produces objects that are strong, lightweight and useful in applications employing glass fiber including, but not limited to, the manufacture of motor vehicles, especially the shell or body of the motor vehicle, including fenders, panels, hoods, trunks and roofs. In another specific embodiment, the present invention may be used to produce hulls and decks of boats and ships, or to coat the surfaces of existing hulls and decks for protection, maintenance and repair. Boats including but not limited to, sailboats, catamarans, speedboats, power boats, fishing boats, cabin cruisers, houseboats, and rowboats, may all be made with the present invention.

It is to be understood that the objects made through the practice of the present invention possess special properties such as fire retardance, chemical resistance, weather resistance, biological resistance, including resistance to microbes, resistance to environmental contaminants and pollution, corrosive resistance, resistance to ultraviolet radiation, heat resistance, resistance to cracking and breakage, and electrical properties. These properties can be enhanced by altering the addition of specific chemicals disclosed herein.

A further embodiment of the present invention is a polyester resin prepared by the following method. Propylene glycol is reacted with one or more monomers selected from the maleic anhydride, phthalic anhydride, and fumaric acid. Desirably, the reaction takes place in a temperature controlled, nitrogen purged, vacuum conditioned environment. The reactants are mixed in a reaction vessel, such as a 3-neck flask, and the reaction vessel is subsequently purged with nitrogen gas. The temperature of the reaction mixture is increased to about 80–90° C. until the reactants melt. The reaction temperature is slowly increased to about 180–190° C. and held at this temperature for about 6 hours. Desirably, the reaction vessel is vacuum conditioned in order to remove the water produced during the polyester ratification reaction. It is believed that water is produced in the above-described reaction after about 50 minutes at a temperature of 180–190° C. In one embodiment of the present invention, vacuuming of the system takes about 3 to 4 hours after the reaction starts. In a further embodiment of the present invention, one or more polymerization inhibitors may be added to the reaction vessel to stop the polymerization reaction. Suitable polymerization inhibitors include, but are not limited to, hydroquinone.

It is also desirable to use a Dean-Stark trap and a water-cooled condenser for refluxing in order to prevent propylene glycol and phthalic anhydride from vaporizing and leaving the reaction flask. It is desirable to maintain the molar ratio of propylene glycol, maleic anhydride and maleic anhydride at a molar ratio of about 1:0.5:0.5. In order to prevent loss of propylene glycol due to its low boiling point, it is desired to increase the amount of propylene glycol in the system to about 5 wt. % greater than the above-described molar ratio. In an alternative method of making the polyester resin, a portion of the maleic anhydride is replaced with fumaric acid to obtain a molar ratio of propylene glycol, fumaric acid, phthalic anhydride, and maleic anhydride of about 1:0.3:0.5:0.2. When fumaric acid is added to the reaction vessel, the reaction mixture is preferably based with a temperature of 150° C. for about 1 hour to improve the solubility of fumaric acid in the reaction mixture.

Another embodiment of the present invention is a prepolymer resin that is substantially non-flammable. As used herein, non-flammable describes a prepolymer composition that has a flash point, as determined by the closed cup flash point determination, of greater than 150° F., with a preferable flash point of greater than 190° F., with the most desirable flash point of greater than 212° F. The prepolymer resins are prepared by mixing ethylene glycol with maleic anhydride and heating the solution. A second solution is prepared by mixing polyethylene glycol with a resin such as a polyester resin. This second solution is heated and mixed. The two solutions are then mixed and a monomer or low molecular weight polymer such as styrene or ethylene dimethacrylate is added and the mixture is heated. This solution is substantially non-flammable and can be used as a prepolymer in preparing polymers. The non-flammable prepolymer solution can be polymerized in a variety of ways known to those of ordinary skill in the art.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention. For example, it is to be understood that the amounts of reagents used in the following Examples are approximate and that those skilled in the art might vary these amounts and ratios by as much as 30% without departing from the spirit of the present invention.

EXAMPLE 1
Non-shrinking Additive (A)

A first non-shrinking additive (A) that can be used with conventional resins to inhibit shrinking of the resin as it cures is described in this example. The formulation comprises the following:

Additive A (Non-shrinking formulation)

Formaldehyde 100 ml

Ethylene Glycol 100 ml

Copper perchlorate 10 mg

Copper chloride 20 mg

The copper chloride and copper perchlorate were dissolved into the formaldehyde and the ethylene glycol.

EXAMPLE 2
Non-shrinking Additive (B)

A second non-shrinking additive (B) that can be used with conventional resins to inhibit shrinking of the resin as it cures is described in this example. The formulation comprises the following:

Additive B (Non-shrinking formulation)

Benzoyl peroxide 18mg

Methyl methacrylate 50 ml

N-methylpyrrolidinone 20 ml

The benzoyl peroxide was dissolved into the methyl methacrylate and N-methylpyrrolidinone.

EXAMPLE 3
Non-Cracking Additive

A third additive, a non-cracking formulation that can be used with conventional resins to inhibit shrinking of the resin as it cures, is described in this example. The formulation comprises the following:

Additive C (Non-cracking formulation)

N butyl mercaptan 100 mg

Tetraethylammonium bromide 1 mg

EXAMPLE 4

To a polyester resin was added equal amounts of $CaCO_3$ pretreated with a polar solvent or mixed in dilute polar polymer, such as slightly acidic water, alcohol, or about 10 wt % carboxymethylcellulose in slightly acidic water. Next approximately 0.2 wt % of additive A, about 1.8 wt % of non-shrinking additive B, 1–2 wt % of N,N-dimethylaniline, and approximately 2 wt % of the non-cracking additive C were added. Next, an initiator, benzoyl peroxide, and a catalyst, cobalt II acetate, were added at concentrations of about 2 wt % each to polymerize the resin. The resin polymerized with no detectable shrinkage or cracking. All percentages in this example are expressed as weight percent (wt %) unless otherwise indicated.

EXAMPLE 5
Dispersant Formulation

A dispersant formulation for pretreating fillers was prepared as follows: about 60 grams of dodecylbenzene sulfonic acid (sodium salt) was dissolved completely in approximately 60 ml of aqueous 0.1 M p-toluene sulfonic acid monohydrate. Then, about 2580 ml of ethylene glycol and about 1200 ml of 0.1 M p-toluene sulfonic acid solution were added. The resulting solution was then thoroughly mixed. Fillers were either added directly to the formulation or were pretreated with an organic alcohol, such as ethyl alcohol or an organic carboxylic acid, such as acetic acid (approximately 0.01–0.1 M) at a slightly acidic pH. The fillers to be added to the resin were immersed in the dispersant formulation for a period of about 0.5 to 2 hours. The fillers were then added to the resin mixture.

EXAMPLE 6
Cultured Marble

This Example describes the production of cultured marble using the additives of the present invention and a filler that is not a polar polymer. The production of cultured marble was in two parts. The conventional resin made up the body of the cultured marble object. The gel coat provided a smooth surface for the cultured marble object. The surface and the mix are capable of being colored.

The basic resin in this Example was about 300 ml of diethyl fumarate trans-2-butene 1,4 diol gel. It is to be understood that any resin or polyester resin may be used in the practice of the method disclosed in this Example. The filler was prepared as follows: about 732.5 gm of $CaCO_3$ and approximately 504 gm of $TiO_2$ were mixed and then treated with about 10–20% by weight of ethyl alcohol or slightly acidic water for approximately 1 hour. Fillers other than $CaCO_3$ and $TiO_2$, including, but not limited to, powders, sand, soil, and fly ash, may be used in this invention. The dispersant formulation from Example 5 was then added to the filler preparation at a concentration of about 1.5% by weight. The resin (diethyl fumarate trans-2-butene 1,4 diol gel) was then mixed with the filler in dispersant formulation. Additive A from Example 1, additive B from Example 2 and non-shrinking additive C from Example 3 were then added in any order to a final concentration of about 1% by weight of each. To this mixture was added about 70 ml of ethylene glycol, 70 ml of styrene, 12 ml of cobalt II acetate and 14 ml of N,N-dimethylaniline. This formulation was thoroughly mixed. To polymerize the conventional resin, approximately 10 ml of a 30% solution of benzoyl peroxide was added. This formulation is designated the "basic resin."

The gel coat resin was prepared as follows: A first formulation was prepared by mixing about 1008 gm of $TiO_2$ or $CaCO_3$ with about 60 ml of 4 wt % diluted dodecyl benzene in water. Approximately 60 ml of the conventional resin without benzoyl peroxide was added along with about 6.5 ml of cobalt II acetate. The first formulation was then thoroughly mixed.

A second gel coat preparation comprises approximately 300 ml of GEL COAT resin from Occidental Chemicals (or any other gel coat resin known to those of ordinary skill in the art) mixed with about 105 gm of $TiO_2$. The first preparation and the second gel coat preparation were mixed in a ratio of approximately 2 to 1. Just before use, an initiator such as 10% to 30% methyl ethyl ketone peroxide or 10% to 30% benzoyl peroxide was added at a final concentration of about 2% by volume.

The gel coat preparation was coated on the surface of a form. The basic resin formulation was then poured into the form and allowed to cure. The resin cured to hardness within approximately 5 minutes and was completely cured within about 1 hour. The resulting object could be removed from the mold after approximately 10 minutes.

EXAMPLE 7
Rapid Casting Method for Gel Coat Preparations and Conventional Resin Formulations This example describes a method for rapid casting that may be employed with both the gel coat preparations, including cultured marble, and conventional resin formulations. The method involves two steps which may be practiced at room temperature and involves the use of a polar polymer as the filler. The method produces a smooth surface. In addition, the resins from Example 6 may be used in the practice of the method disclosed in this Example.

Step 1: First, a carboxymethylcellulose (CMC) gel was formed by saturating about 5g of CMC powder with methanol. Next, the CMC was slowly added to approximately 800 ml of water while mixing to make a CMC solution. Alternatively, CMC may be saturated with ethanol instead of methanol and mixed with water in a similar manner.

Step 2: To each 40 ml of gel coat or resin formulation, was added between approximately 3 ml and 6 ml of the CMC solution. Optionally, approximately 10% to 20% by weight of ethylene glycol and/or styrene were added to this mixture. The amount of CMC solution was based on the desired strength, appearance, and cost of the final product. Next, about 1–2% (vol %) of N,N-dimethylaniline was added together with any known catalyst while mixing. Catalysts which may be employed at this step include, but are not limited to, methylene II acetate, chromium II acetate, copper II acetate and cobalt II naphthanate. Catalysts were added at approximately 10% (vol %) in solvents such as alcohol, styrene, water, or any suitable solvent for the specific catalyst.

The reaction was initiated by adding about 1–2% (vol %) of peroxide and mixing into the other ingredients. Suitable peroxides include, but are not limited to, methyl ethyl ketone peroxide, hydrogen peroxide, and dibenzoyl peroxide at initial concentrations of about 10% to 30%. Other initiators that have been used include other peroxide initiators and azo initiators. The curing rate and heat generated vary depending on the amount of CMC gel and peroxides employed. Addition of less gel produced less heat and increased curing time while addition of more gel resulted in generation of higher amounts of heat and reduced curing times.

The method of this example produced a clear gel coat in contrast to many methods taught in the art. In addition, this method was amenable to pouring the gel coat into a mold, and painting or spraying the gel coat onto a surface. Additional examples of this method are provided in Table 8 below. Sample 11 in Table 8 produced excellent results.

EXAMPLE 8

Method of Strengthening Objects Made from Resin Through Addition of a Hardener Solution This example describes a hardener solution that can be used to make an inexpensive, clear and strong resin. In addition, inexpensive and strong gel coat resins may be produced by the method of this example. Both conventional resins and gel coat resins may be made stronger using the hardener solution of the present example.

Step 1: Formulation for a Hardener Solution in a Cold Bath: A hardener solution was made by dissolving benzoyl peroxide to saturation in about 50 ml of methylmethacrylate in a beaker maintained in an ice bath. An equal volume of styrene was added and mixed.

Step 2: Formation of Conventional Resins and Gel Coat Resins of Increased Strength: In order to make an inexpensive clear gel coat, between about 1 ml and 5 ml of the CMC solution of Step 1 of Example 7 was slowly mixed with approximately 50 ml of polyester resin. It is to be understood that any CMC or polar polymer or any polymer that will swell in water may be used in the practice of the present invention. Next, about 50 ml of the gel coat resin of Example 7 was added and slowly mixed. Between about 0.1 ml and 1.0 ml of N,N dimethylaniline was added (preferred volume of 0.25 ml). About 0.1 ml to 2.0 ml of a cross-linker, poly(ethyleneglycol-400) dimethacrylate, was added. It is to be understood that any ethylene glycol cross-linker or other cross-linker such as divinyl monomers, may be employed. Next, about 0.1 ml to 1.5 ml of the catalyst, cobalt II naphthanate, was added. A preferred volume of cobalt II naphthanate was approximately 0.25 ml. Catalysts which may be employed at this step include, but are not limited to, methylene II acetate, chromium II acetate, copper II acetate and cobalt II acetate. Catalysts were added at about 10% (vol %) in solvents such as alcohol, styrene, water, or any suitable solvent for the specific catalyst.

The hardener solution (about 0.5 ml) was then added. The reaction was initiated by adding from about 0.25 ml to 2.0 ml of the initiator methyl ethyl ketone peroxide. A preferred volume of methyl ethyl ketone peroxide was approximately 0.35 ml. Other initiators which may have been used include, but are not limited to, methyl ethyl ketone peroxide, hydrogen peroxide, and dibenzoyl peroxide at concentrations of about 10% to 30%, and azo compounds.

EXAMPLE 9

Method of Strengthening Objects Cast from Conventional and Gel Coat Resins by Varying the Amount of CMC Solution The following example demonstrates a method for increasing the structural strength of objects cast from resins. This method may be used to increase the strength of objects cast from conventional resins and gel coat resins. As shown in this Example, as the amount of CMC solution of Example 7 was increased in the presence of the proper amounts of catalysts, hardeners and initiators, the strength of the resulting object increased while the weight decreased.

To about 100 ml of conventional polyester resin was added between approximately 2 ml and 25 ml of the CMC solution of Example 7. Next, about 100 ml of MARBLE CLEAR GEL COAT™ resin (Manufacturer Code No. CG-07012) purchased from Neste Co. (Atlanta, Ga.) was added. To this mixture were added approximately 1 ml of dimethylaniline, 2 ml of the cross-linker of Example 8, poly(ethyleneglycol-400) dimethacrylate, 1 ml of catalyst (cobalt II naphthanate), 2 ml of the hardener solution of Example 8, and 0.5 ml of the initiator, methyl ethyl ketone peroxide. The initiator, methyl ethyl ketone peroxide, or other initiators that may be used in the present invention are added last, however there is no special order for adding the other ingredients described in this Example. It is to be understood that any ethylene glycol cross-linker or other cross-linker, such as divinyl monomers, may be employed. In addition, the other initiators and catalysts listed in Example 8 have been used in the present invention. In this Example, about 2 ml, 5 ml or 10 ml of the CMC solution of Example 7 was used and the resulting object tested. These objects were tested to measure the compression strength and flexibility using a device with an upper test limit of 3000 pounds per square inch (psi). The objects made with 2 ml, 5 ml or 10 ml of the CMC solution displayed strength of 2500 psi, 2900 psi, and more than 3000 psi, respectively. The resin would not break in this machine.

Comparative tests of DuPont CORIAN® materials of comparable thickness at twice the weight of the object of the present Example made with about 10 ml of the CMC solution showed that the CORIAN® samples broke at 2100 psi while the object of the present Example did not break. Therefore, this object had a strength greater than the upper test limit of the test machine (greater than 3000 psi).

EXAMPLE 10
Hard Surface Material

To approximately 300 ml of a conventional resin, such as a polyester resin, was added about 40 ml of styrene, 20 ml of methylmethacrylate and 5 ml of a dispersant formulation. The dispersant formulation was comprised of about 20 gm dodecylbenzene sulfonic acid (sodium salt) mixed in about 10 ml of aqueous 0.1 M p-toluene sulfonic acid monohydrate, which was then mixed with about 20 ml of ethylene glycol, 10 ml of methylmethacrylate and 10 ml of styrene. The resulting solution was then thoroughly mixed and approximately 70 ml of the CMC solution of Example 7 (step 1) was added. It is to be understood that any CMC or polar polymer or any polymer that will swell in water may be used in the practice of the present invention.

Next, about 300 ml of MARBLE CLEAR GEL COAT™ resin (Manufacturer Code No. CG-07012) (Neste Co., Atlanta, Ga.) was added to this solution, followed by the addition of approximately 5% fiberglass (vol %) which was about 35 ml of compacted fiberglass. The compacted fiberglass was first soaked in about 90% ethylene glycol and about 10% of the dispersant formulation described above, mixed briefly in a blender, and pressure was applied until most of the fluid was removed. Next approximately 4 ml of N,N-dimethylaniline was added followed by about 8 ml of a cross-linker solution, for example a cross-linker solution of poly(ethyleneglycol-400)dimethacrylate or pentaerythritol tetraacrylate, and about 4 ml of catalyst (cobalt II naphthanate). These three chemicals were added in any order. Next, 8 ml of the hardener solution of Example 8, Step 1, was added followed by addition of between 3 to 7 ml of a 30% solution of the initiator methyl ethyl ketone peroxide in styrene. Other initiators, including peroxide initiators, have been used at solution strengths of approximately 10%–30% in the appropriate solvents. Catalysts which could be employed at this step include, but are not limited to, methylene II acetate, chromium II acetate, copper II acetate and cobalt II acetate. Catalysts were added at about 10% (vol %) in solvents such as alcohol, styrene, water, or any suitable solvent for the specific catalyst.

The reaction was initiated by adding from about 3 ml to 7 ml of a 30% solution of the initiator methyl ethyl ketone peroxide. A preferred volume of initiator methyl ethyl ketone peroxide was 5 ml. Other initiators which have been used were peroxides including, but not limited to, methyl ethyl ketone peroxide, hydrogen peroxide, and dibenzoyl peroxide at concentrations of 10% to 30% in appropriate solvents. Other peroxide initiators and azo initiators may also be used. The initiator methyl ethyl ketone peroxide, or other initiators that may be used in the present invention were added last. It is to be understood that any ethylene glycol cross-linker or other cross-linker, such as divinyl monomers, may be employed. In addition, the other initiators and catalysts listed in Example 8 could be used in the present invention. After all reagents were included, the mixture was poured into a mold and placed on a vibrating table to facilitate removal of air bubbles.

The object made with the method of the present example was tested to measure the compression strength and flexibility using a device with an upper limit of 3000 pounds per square inch (psi). Comparative tests of DuPont CORIAN® materials of comparable thickness at twice the weight of the object of the present Example showed that the CORIAN® samples broke at 2100 psi while the object of the present Example broke at 2200 psi.

In the formation of another object using the method of the present example, a volume of about 500 ml of resin and about 100 ml of gel coat were used together with the same volumes of other reagents as reported above. The resulting object was very hard but compression tests were not performed. In addition, different volumes of about 30, 40, 50, and 90 ml of the CMC solution were used together with the different reagent volumes described above. In general, as the amount of CMC in the mixture increased, the flexibility of the formed object increased.

EXAMPLE 11
Hard Surface Material

To approximately 300 ml of a conventional resin, such as a polyester resin, were added about 40 ml of styrene, 30 ml of methylmethacrylate, and 8 ml of the dispersant formulation of Example 10. The dispersant formulation was comprised of about 20 gm dodecylbenzene sulfonic acid (sodium salt) mixed in approximately 10 ml of aqueous 0.1 M p-toluene sulfonic acid monohydrate, which was then mixed with about 20 ml of ethylene glycol, 10 ml of methylmethacrylate and 10 ml of styrene. The resulting solution was then thoroughly mixed and about 70 ml of the CMC solution of Example 7 (step 1) was added. It is to be understood that any CMC or polar polymer or any polymer that will swell in water may be used in the practice of the present invention.

Next, about 300 ml of MARBLE CLEAR GEL COAT™ resin (Manufacturer Code No. CG-07012) (Neste Co., Atlanta, Ga.) was added to this solution, followed by addition of approximately 5% fiberglass (vol %) which is about 35 ml of compacted fiberglass. The compacted fiberglass was first soaked in about 90% ethylene glycol and 10% dispersant formulation, mixed briefly in a blender, and pressure was applied until most of the fluid was removed. Next approximately 4 ml of N,N-dimethylaniline was added followed by about 8 ml of a cross-linker solution of either poly(ethyleneglycol-400)dimethacrylate, or pentaerythritol tetraacrylate and 4 ml of catalyst (cobalt II naphthanate). These three chemicals could be added in any order. Next, about 8 ml of the hardener solution of Example 8, Step 1, was added followed by about 5 ml of the initiator methyl ethyl ketone peroxide. Catalysts which could be employed at this step include, but are not limited to, methylene II acetate, chromium II acetate, copper II acetate and cobalt II acetate. Catalysts were added at 10% (vol %) in solvents such as alcohol, styrene, water, or any suitable solvent for the specific catalyst.

The reaction was initiated by adding from about 3 ml to 7 ml of the initiator methyl ethyl ketone peroxide. A preferred volume of initiator methyl ethyl ketone peroxide was about 5 ml. Other initiators which were used were peroxides including, but not limited to, methyl ethyl ketone peroxide, hydrogen peroxide, and dibenzoyl peroxide at concentrations of about 10% to 30% in appropriate solvents. Other peroxide initiators and azo initiators may also be used. The initiator methyl ethyl ketone peroxide, or other initiators that were used in the present invention were added last. It is to be understood that any ethylene glycol cross-linker or other cross-linker, such as divinyl monomers, may be employed. In addition, the other initiators and catalysts listed in Example 8 may be used in the present invention. After all reagents were included, the mixture was poured into a mold and placed on a vibrating table to facilitate removal of air bubbles.

The object made with the method of the present example was tested to measure the compression strength and flexibility using a device with an upper limit of 3000 psi. Comparative tests of DuPont CORIAN® materials of comparable thickness at twice the weight of the object of the present Example showed that the CORIAN® samples broke at 2100 psi while the object of the present Example broke at 2400 psi.

In the formation of another object using the method of the present example, a volume of about 500 ml of resin and about 100 ml of gel coat were used together with the same volumes of other reagents as reported above. The resulting object was very hard but compression tests were not performed.

EXAMPLE 12
Hard Surface Material

To about 300 ml of a conventional resin, such as a polyester resin, were added approximately 30 ml of styrene, about 40 ml of polymethylmethacrylate (20% wt/vol), and approximately 15 ml of a dispersant formulation. The dispersant formulation was comprised of about 20 gm dodecylbenzene sulfonic acid (sodium salt) mixed in approximately 10 ml of aqueous 0.1 M p-toluene sulfonic acid monohydrate, which was then mixed with about 20 ml of ethylene glycol, 10 ml of methylmethacrylate and 10 ml of styrene. The resulting solution was then thoroughly mixed and approximately 70 ml of the CMC solution of Example 7 (step 1) was added. It is to be understood that any CMC or polar polymer or any polymer that will swell in water could be used in the practice of the present invention.

Next, about 300 ml of MARBLE CLEAR GEL COAT™ resin (Manufacturer Code No. CG-07012) (Neste Co., Atlanta, Ga.) was added to this solution, followed by addition of approximately 5% fiberglass (vol %) which is about 35 ml of compacted fiberglass. The compacted fiberglass was first soaked in about 90% ethylene glycol and about 10% dispersant formulation, mixed briefly in a blender, and pressure was applied until most of the fluid was removed. Next approximately 5 ml of N,N-dimethylaniline was added followed by about 9 ml of a cross linker solution of either poly(ethyleneglycol-400)dimethacrylate or pentaerythritol tetraacrylate and 5 ml of catalyst (cobalt II naphthanate). These three chemicals were added in any order. Next, about 9 ml of the hardener solution of Example 8, Step 1, was added followed by 6 ml of the initiator methyl ethyl ketone peroxide. Catalysts which may be employed at this step include, but are not limited to methylene II acetate, chromium II acetate, copper II acetate and cobalt II acetate. Catalysts were added at 10% (vol %) in solvents such as alcohol, styrene, water, or any suitable solvent for the specific catalyst.

The reaction was initiated by adding from about 4 ml to 8 ml of the initiator methyl ethyl ketone peroxide. A preferred volume of initiator methyl ethyl ketone peroxide was 6 ml. Other initiators which have been used were peroxides including methyl ethyl ketone peroxide, hydrogen peroxide, and dibenzoyl peroxide at concentrations of 10% to 30% in appropriate solvents. Other peroxide initiators and azo initiators may also be used. The initiator methyl ethyl ketone peroxide, or other initiators used in the present invention were added last. It is to be understood that any ethylene glycol cross-linker or other cross-linker, such as divinyl monomers, may be employed. In addition, the other initiators and catalysts listed in Example 8 may be used in the present invention. After all reagents are included, the mixture was poured into a mold and placed on a vibrating table to facilitate removal of air bubbles.

The object made with the method of the present example was tested to measure the compression strength and flexibility using a device with an upper limit of 3000 psi. Comparative tests of DuPont CORIAN® materials of comparable thickness at twice the weight of the object of the present Example made showed that the CORIAN® samples broke at 2100 psi while the object of the present Example did not break, and therefore had a strength greater than the upper test limit of the test machine (greater than 3000 psi).

In the formation of another object using the method of the present example, a volume of about 500 ml of resin, and about 100 ml of gel coat were used together with the same volumes of other reagents as reported above. The resulting object was very hard but compression tests were not performed.

EXAMPLE 13
Flexible Hard Materials

This example presents three methods of making a flexible hard material.

Mixture A: Mixture A was prepared by mixing the following reagents: between about 470 to 530 gm of calcium carbonate; about 65 ml of a solution comprised of approximately 80% by volume of water, 18% ethyl alcohol and 2% acetone; about 350 ml of gel coat resin or polyester resin; and approximately 10 ml of polyacrylic acid solution. The polyacrylic acid solution was made by wetting 1 gm of polyacrylic acid with ethanol followed by addition of about 50 ml of water.

Mixture B: Mixture B was prepared by mixing the following reagents: between about 470 to 530 gm of calcium carbonate; about 65 ml of a solution comprised of approximately 80% by volume of water, 18% ethyl alcohol and 2% acetone; about 350 ml of gel coat resin and approximately 30 ml of polyacrylic acid.

Method 1: To about 350 ml of mixture A were added sequentially about 200 ml of epoxy resin, approximately 10 ml of the dispersant of Example 12, and about 100 ml of ethylene glycol. Next, about 100 ml of styrene and about 100 ml of polymethylmethacrylate were added in any order. Approximately 4 ml of N,N-dimethylaniline, about 11 ml of a cross linker solution of poly(ethyleneglycol-400) dimethacrylate, and 4 ml of catalyst (cobalt II naphthanate) were added. Next approximately 11 ml of the hardener solution of Example 8 (Step 1), and about 5 to 9 ml of the initiator methyl ethyl ketone peroxide were added. A preferred volume of methyl ethyl ketone peroxide was 7 ml. Other initiators which may be used are peroxides including, but not limited to, methyl ethyl ketone peroxide, hydrogen peroxide, and dibenzoyl peroxide at concentrations of 10% to 30% in appropriate solvents. Other peroxide initiators and azo initiators may also be used. The initiator solution was always added last and was preceded by the hardener solution.

Method 2: To about 350 ml of mixture A were added approximately 350 ml of epoxy resin, about 100 ml of ethylene glycol, approximately 100 ml of styrene, about 100 ml of methylmethacrylate, about 20 ml of the dispersant of Example 12, approximately 5 ml of N,N-dimethylaniline, about 11 ml of cross linker solution of Example 8 (poly (ethyleneglycol-400)dimethacrylate), approximately 5 ml of catalyst (cobalt II naphthanate), approximately 11 ml of the hardener solution of Example 8 (Step 1), and about 6 to 10 ml of the initiator methyl ethyl ketone peroxide. A preferred volume of methyl ethyl ketone peroxide was 8 ml. It is to be understood that other initiators as described in Method 1 may be used. The object resulting from practice of this method was extremely flexible and did not break at a pressure of 3000 psi.

Method 3: To approximately 350 ml of mixture B were added about 350 ml of epoxy resin, approximately 100 ml of ethylene glycol, approximately 100 ml of styrene about 100 ml of polymethylmethacrylate about 20 ml of the dispersant of Example 12, approximately 5 ml of dimethylaniline, approximately 11 ml of the cross linker solution of Example 8 (poly(ethyleneglycol-400)dimethacrylate), about 5 ml of catalyst (cobalt II naphthanate), approximately 11 ml of the hardener solution of Example 8 (Step 1), and about 6 to 10 ml of the initiator methyl ethyl ketone peroxide. A preferred volume of methyl ethyl ketone peroxide was 8 ml. It is to be understood that other initiators as described in Method 1 may be used.

It should be understood that other initiators, cross-linkers, catalysts and resins described in precedirg example 12 may be used in the practice of the invention disclosed in this example.

EXAMPLE 14
Flexible Materials with High Tensile Strength Preparation of Polyaniline used to make the Flexible Materials with High Tensile Strength To produce the polyaniline used in the present invention, a prepolymer solution was prepared by mixing about 21 ml of distilled purified aniline with about 300 ml of 1 M HCl. The prepolymer solution was then placed in a three necked flask and purged with nitrogen and cooled to about 5° C. In a separate container, approximately 12 gm ammonium persulfate was dissolved in about 200 ml of 1 M HCl. The container was purged with pure nitrogen. The ammonium persulfate solution was cooled to about 5° C. and then added to the 3 necked flask. The mixture was cooled to about 0° C. and stirred for approximately 20 minutes. The temperature of the solution was then raised to a temperature between approximately 8° to 10° C. for 15 minutes. Next, the solution was cooled to about 0° C. and stirred for 45 minutes. The polyaniline precipitate was then washed several times by filtration with distilled water. The polyaniline precipitate was treated with 1 M potassium hydroxide for 24 hours after which it was filtered, washed again for 6 to 12 hours in distilled $H_2O$, heated, and dried in a vacuum oven for about 24 hours at 50° C. The dried polyaniline was ground into a powder. The mixture was optionally extracted with a soxhlet extraction with acetonitrile for 3 hours until the extract was no longer colored. This extraction produced a polyaniline powder. The polyaniline was dried in an oven at about 50° C. for 6 to 7 hours and then ground to a powder. It was then treated with 1 M KOH for approximately 24 hours after which it was filtered, washed again for 6 to 12 hours in distilled $H_2O$ and dried in a vacuum oven for 24 hours at 50° C. The polyaniline precipitate was then dissolved in a N-methylpyrrolidinone (NMP) to saturation. Different amounts of polyaniline may be added to NMP to achieve a final percentage of from approximately 0.1% by weight of the total mixture to a saturated solution. It is to be understood that pyrrolidone and pyrrolidone are synonymous as used throughout the present application.

A resin mix was made with the following method. To about 30 ml of polyester resin were added in sequence approximately 6 ml of styrene, 0.75 ml N,N-dimethylaniline, 0.75 ml of cobalt II naphthanate as catalyst, 0.5 ml of the saturated solution of polyaniline in N-methylpyrrolidinone as described above, and about 0.25 ml of the initiator methyl ethyl ketone peroxide.

The resulting resin displayed a fibrous matrix and was strong and flexible.

EXAMPLE 15
Flexible Materials with High Tensile Strength

In another embodiment of the present invention, the solution of polyaniline in N-methylpyrrolidinone as described in the preceding Example 14, was used and methyl ethyl ketone peroxide was not added to the mixture. The polyaniline in N-methylpyrrolidinone acted as a slower initiator than the methyl ethyl ketone peroxide.

The resulting resin displayed a fibrous matrix and was strong and flexible.

EXAMPLE 16
Polyester Preparations and Compositions

The following solutions were used in surfactant formulations listed below and were combined with the polyester preparations and compositions described in subsequent examples. Percentages indicate volume %.
Solution 1
To 3000 ml of $H_2O$ were added acetone and 1-butanethiol to achieve final volume percentages of approximately 0.2% and 0.04% respectively.
Solution 2—(Final volume percentages are shown)
Methyl ethyl ketone peroxide 99%
Hydrogen peroxide (30% stock solution) 1%
Solution 3
Dodecylbenzenesulfonic acid (sodium salt) 20.0 g
p-toluene sulfonic acid (0.1M) 10.0 g
Hydrochloric acid (0.1M) 1.0 ml
Methylene chloride (10% solution) in methanol 1.0 ml
Ethylene glycol 20.0 ml
Methylmethacrylate 10.0 ml
Styrene 10.0 ml
Hardener solution (Example 8) 1.0 ml
Solution 4
Carboxymethyl cellulose 1 g
Polyacrylic acid 1 g
$H_2O$ 100 ml
Solution 4(A)
Carboxymethyl 1 g
Polyacrylic 1 g
Sodium hydroxide (1M) 50 ml
$H_2O$ 50 ml
Solution 4(B)
Solution 4A 50 ml
Sodium hydroxide 2 g
Solution 5(A)
Solution A (0.5% aqueous solution of CMC) 25 g
Polyacrylic acid 0.5 g
Solution 5(B)
Solution A (0.5% aqueous solution of CMC) 25 g
KOH 0.25 g
Polyacrylic acid 0.5 g
Solution 5(C)
Solution A (0.5% aqueous solution of CMC) 25 g
NaOH 0.25 g
Polyacrylic acid 0.5 g
Solution A (0.5% solution of CMC)
Water 100 g
CMC 0.5 g
*A range of CMC concentrations from 0.25% to 5% has been successfully employed in Solution A.
Surfactant A
Component 1 40 ml
  Component 1 was made as follows:
    5% polyvinyl alcohol solution (aqueous) 30 ml was added to 70 ml ethylene glycol (this solution was heated to about 110° C. while stirring, and the volume was reduced to 70 ml total
To 40 ml of Component 1 was added
Ethyl alcohol (distilled) 20 gm
Dodecylbenzenesulfonic acid, sodium salt 2.5 g Surfactant B
Component 2 20 g
   Component 2 was made as follows:
   1) Ethylene glycol 20 g; plus
   2) Dodecylbenzenesulfonic acid, sodium salt 2.5 g
to 20 g of Component 2 was added
Ethyl alcohol (distilled) 5 g
Surfactant C
Polyethylene glycol average molecular weight 200 20 g
Dodecylbenzenesulfonic acid 2.5 g
Heat of 70° C. to 80° C. was applied either while dissolving dodecylbenzenesulfonic acid in polyethylene glycol or before the dodecylbenzenesulfonic acid was added to the polyethylene glycol.
Surfactant D
Polyethylene glycol average molecular weight 400 20 g
Dodecylbenzenesulfonic acid 2.5 g
Heat of 70° C. to 80° C. was applied either while dissolving dodecylbenzenesulfonic acid in polyethylene glycol or before the dodecylbenzenesulfonic acid was added to the polyethylene glycol.
Surfactant E
Polyethylene glycol average molecular weight 600 20 g
Dodecylbenzenesulfonic acid 2.5 g
Heat of 70° C. to 80° C. was applied either while dissolving dodecylbenzenesulfonic acid in polyethylene glycol or before the dodecylbenzenesulfonic acid was added to the polyethylene glycol.

EXAMPLE 17

Flexible and flame retardant sample

In a container, approximately 250 ml of epoxy resin, about 200 ml of polyester resin, and 3 ml of Solution 4 from Example 16 were thoroughly mixed. In a separate container, about 200 ml of fly ash and approximately 20 ml of Solution 1 from Example 16 were mixed thoroughly to ensure that the liquid was dispersed evenly through the filler matrix. The contents of both containers were combined into a single container and mixed thoroughly. While mixing, about 2 ml each of N,N-dimethylaniline, polyethylene glycol 400 dimethacrylate, cobalt naphthanate and Solution 2 from Example 16 were added. All constituents were mixed until evenly distributed. The contents were poured into mold a and ejected when cured.

EXAMPLE 18

High flexibility sample

Step 1 Mixture: About 20 ml each of polyester resin and methyl methacrylate were combined in a container and mixed thoroughly. In a separate container, about 50 ml of epoxy resin and 1 ml each of polyethylene glycol 400 dimethacrylate and Solution 2 from Example 16 were added and mixed thoroughly. Approximately 1 ml each of N,N-dimethylaniline and cobalt naphthanate were added and mixed thoroughly.

Next, about 50 ml of vinylester resin, 5 ml of the step 1 mixture and 1 ml of solution 2 were added. These reagents were mixed thoroughly. Approximately 1 ml each of N,N-dimethylaniline, cobalt naphthanate and Solution 2 were added while mixing and then thoroughly mixed. The contents were poured into a mold and ejected when cured.

EXAMPLE 19

Flexible, flame retardant sample

In a container, approximately 50 ml of vinylester resin and 0.5 ml of Solution 4(B) from Example 16 were combined and mixed thoroughly. About 1 ml of 3,5-dimethylaniline, 0.5 ml of polyethylene glycol 400 dimethacrylate, 1 ml each of cobalt naphthanate and Solution 2 from Example 16 were added while mixing. The contents were poured into a mold and ejected when cured.

EXAMPLE 20

Flexible sample

Step 1 Mixture: Approximately 20 ml each of polyester resin and methyl methacrylate were combined in a container and mixed thoroughly. In a separate container about 50 ml of epoxy resin and about 1 ml each of polyethylene glycol 400 dimethacrylate, Solution 4(B) and Solution 2 from Example 16 were combined and mixed thoroughly. Next, about 1.5 ml each of N,N-dimethylaniline and cobalt naphthanate were added and mixed thoroughly.

Next, approximately 50 ml of vinylester resin, 5 ml of the Step 1 Mixture and 1 ml of Solution 2 were added. All ingredients were mixed thoroughly. About 1.5 ml of each of N,N-dimethylaniline and cobalt naphthanate were added and mixed thoroughly. The contents were poured into a mold and ejected when cured.

EXAMPLE 21

Flexible, flame retardant sample with elevated filler content

In a container were combined about 50 gm each of polyester resin, epoxy resin and 2.5 gm of Solution 4 from Example 16 and mixed thoroughly. In a separate container, were mixed about 120 gm of calcium carbonate and 12.7 gm of Solution 1. Next, the ingredients of both containers were combined. While mixing, about 20 gm of ethylene glycol was added while mixing. Next approximately 0.25 ml each of N,N-dimethylaniline, polyethylene glycol 400 dimethacrylate, cobalt naphthanate and Solution 2 from Example 16 were added while mixing. All ingredients were well distributed and then poured into a mold and ejected when cured.

EXAMPLE 22

Flexible, flame retardant sample with elevated filler content

In a container were combined about 50 gm each of polyester resin, epoxy resin and 2.5 gm of Solution 4. These ingredients were mixed thoroughly. In a separate container were mixed about 120 gm of calcium carbonate and 12.7 gm of Solution 1 from Example 16. The ingredients of both containers were combined. Approximately 20 gm of ethylene glycol was added and mixed thoroughly. Next, about 0.5 ml each of 3,5-dimethylaniline and 0.25 gm each of polyethylene glycol 400 dimethacrylate, cobalt naphthanate and Solution 2 were added while mixing. When all ingredients were well distributed, the mixture was poured into a mold and ejected when cured.

EXAMPLE 23

Flame retardant sample suitablefor cable joints

A mixture 1 was made according to the following formula:

| Component | Amount (gm) |
| --- | --- |
| Castor Oil | 365 |
| Linseed Oil | 17 |

| Component | Amount (gm) |
| --- | --- |
| Dibutyltin dilaurate | 0.07 |
| SYLOSIV ® | 10.8 |

(SYLOSIV ® is a commercially available molecular sieve available from GRACE.)

(SYLOSIV® is a commercially available molecular sieve available from GRACE.)

To prepare the sample for molding, about 56.1 gm of mixture 1 was mixed with 18.3 gm of calcium carbonate (Ultrafine) and mixed thoroughly. To this mixture were added about 22.5 gm of 4,4' diphenylmethane diisocyanate and 108.5 gm of a filler such as course sand. The mixture gelled in about 20 minutes.

EXAMPLE 24
Flame retardant sample suitable for cable joints

To prepare the sample for molding, approximately 55.4 gm of mixture 1 were mixed with 18.1 gm of calcium carbonate (Ultrafine) and thoroughly mixed. To this mixture were added approximately 22.5 gm of 4,4' diphenylmethane diisocyanate, 166.3 gm of a filler such as course sand and 3.397 gm of Surfactant A from Example 16. The results showed swelling of the gel.

EXAMPLE 25
Flame retardant sample with 75% filler suitable for cable joints

To prepare the sample for molding, approximately 46.7 gm of mixture 1 was mixed with 19.3 gm of calcium carbonate (Ultrafine) and thoroughly mixed. To this mixture were added about 18.7 gm of 4,4' diphenylmethane diisocyanate, 177.4 gm of a filler such as course sand and 3.397 gm of Surfactant A from Example 16. The results showed swelling of the gel.

EXAMPLE 26
Flame retardant sample suitable for shielding fiber optical cable joints A mixture 1 was made according to the following formula:

| Component | Amount (gm) |
| --- | --- |
| Castor Oil | 34.8 |
| Linseed Oil | 1.69 |
| SYLOSIV ® | 1.02 |
| Calcium Carbonate | 20.71 |
| 4,4' diphenylmethane diisocyanate | 15.04 |
| Calcium Oxide | 0.8 |
| Benzoyl Peroxide | 1.0 |
| Course sand | 140.3 |

The ingredients were added in the order presented and were thoroughly mixed. The mixture gelled in approximately 20 min. The results showed swelling of the gel.

EXAMPLE 27
Flame retardant sample suitable for cable joints

A mixture 1 was made according to the following formula:

| Component | Amount (gm) |
| --- | --- |
| Castor Oil | 365 |
| Linseed Oil | 17 |
| Dibutyltin dilaurate | 0.07 |
| SYLOSIV ® | 10.8 |

To prepare the sample for molding, 55.4 gm of mixture 1 was mixed with approximately 18.1 gm of calcium carbonate (Ultrafine). Mix thoroughly. To the mixture 1, were added about 22.2 gm of 4,4' diphenylmethane diisocyanate, 166.3 gm of a filler such as course sand and 3.4 gm of a surfactant. The surfactant used in this example was surfactant A. The mixture gelled in about 20 minutes. The results showed some swelling of the gel.

Table 2 presents several additional examples of samples made with the indicated amounts of reagents.

EXAMPLE 28
Method of Making Non-flammable, Liquid, Resin

Method 1: A non-flammable liquid resin was made by a method comprising the following steps: about 100 gm methylmethacrylate, 5 gm polymethylmethacrylate (molecular weight about 75,000), 0.5 gm cobalt II naphthanate, 0.2 gm α-picoline, and 0.3 gm 2,2'-azobisisobutyronitrile (AIBN) were mixed; the mixture was heated to approximately 50° C. until boiling. Next, about 1 ml of 1M hydrochloric acid was added to stop polymerization. Next, powdered styrene was added to this mixture and the mixture was heated to a temperature from about 60° C. to 70° C. until the styrene dissolved.

Method 2: A non-flammable liquid resin was made by a method comprising the following steps: about 100 g of styrene, 0.5 gm cobalt II naphthanate, 0.4 gm α-picoline, and 0.3 gm 2,2'-azobisisobutyronitrile (AIBN) were mixed; the mixture was heated to approximately 80° C. until boiling for a period of about 10 minutes. Next, about 1 ml of 1M hydrochloric acid was added to stop polymerization.

Method 3: A non-flammable liquid resin is made by a method comprising the following steps: a resin formulation is made by mixing about 98.06 gm of maleic anhydride and about 62.07 gm of ethylene glycol or propylene glycol while purging with inert gas, such as nitrogen, throughout the entire reaction, in a vacuum oven; heating the mixture to approximately 190° C. to 200° C. for about 4 hours; then at 215° C. for about 3 hours slowly cooling the mixture and next adding ethylene chloride. The mixture is then cooled for 2 hours at about 5° C. The resulting polyester powder was then dissolved separately in the solvents of Methods 1 and 2 to produce two non-flammable liquid resin formulations.

EXAMPLE 29
Method of Making Objects With High Strength, Low or No Shrinkage, and Low Flammability Objects were made by mixing MARBLE CLEAR GEL COAT™ resin (Manufacturer Code No. CG-07012) (Neste Co., Atlanta, Ga.), HARD SURFACE resin (Densified Unsaturated Polyester Resin; Manufacturer Code No. 748-3677) (McWhorter Co., Inc.), polar polymer (an aqueous solution of CMC (0.5%)), polyacrylic acid, methylmethacrylate, N,N-dimethylaniline, cross-linker (polyethylene glycol 400 dimethacrylate), catalyst (cobalt II naphthanate), and Solution 2 from Example 16, in the amounts and in the order indicated in Table 3. The best results are indicated by asterisks next to the sample number at the top of the corresponding column.

Objects were made by mixing resin (vinyl ester resin), polar polymer (an aqueous solution of CMC (0.5%)), calcium carbonate, Solution 1 from Example 16, ethylene glycol, monomer (styrene), diisocyanate, N,N-dimethylaniline, catalyst (cobalt II naphthanate), hardener solution (Step 1 from Example 8), Solution 2 from Example 16, and cross-linker (polyethylene glycol 400 dimethacrylate), in the amounts and in the order indicated in Table 4. The best results are indicated by asterisks next to the sample number at the top of the corresponding column.

Objects were made by mixing resin (vinyl ester resin), a basic solution of polar polymer (an aqueous solution of CMC (0.5%)) and polyacrylic acid, in some cases Solution 4 from Example 16, in some cases cross-linker (polyethylene glycol 400 dimethacrylate), N,N-dimethylaniline, in some cases diisocyanate-methylmethacrylate, catalyst (polyethylene glycol 400 dimethacrylate), and Solution 2 from Example 16, in the amounts and in the order indicated in Table 5. Preferred embodiments were obtained in Samples 2 and 3 shown in Table 5 with the most preferred embodiment shown as Sample 4 of Table 5.

The objects made with this method demonstrated very low or no shrinkage. Tests conducted with up to seven applications of the flame of a propane torch for periods of 30 seconds showed that the objects made with this method did not burn or smoke.

EXAMPLE 30
Method of Making Lightweight, Economical, Non-flammable Objects With High Filler Content Lightweight, non-flammable objects with high filler content were made according to the following methods. These objects are useful in the construction industry and could be used as roofing tiles, among other objects. Some of the objects have high epoxy content and exhibit flexibility while other objects made with low epoxy content were rigid and hard. These properties were obtained using a final resin content of about 6.5%. All the formulations are pourable and castable into a desirable shape.

Method 1: Objects were made by mixing calcium carbonate, Solution 1 from Example 16, polyester resin, Solution 4 from Example 16, epoxy resin, ethylene glycol, N,N-dimethylaniline or 3,5-dimethylaniline, cross-linker (polyethylene glycol 400 dimethacrylate), catalyst (cobalt II naphthanate), and initiator (Solution 2 from Example 16) in the amounts and in the order indicated in Table 6. Preferred embodiments were obtained in Samples 1 and 2 shown in Table 6.

Method 2: Objects were made by mixing polyester resin, Solution 4 from Example 16, styrene, Surfactant E from Example 16, filler (sand, coarse fly ash, or fine fly ash), calcium carbonate, Solution 1 from Example 16, N,N-dimethylaniline, catalyst (cobalt II naphthanate), and initiator (Solution 2 from Example 16) in the amounts and in the order indicated in Table 7. The preferred embodiment is shown as sample 1 in Table 7 which contained about 78% solids and about 6.5% resin.

EXAMPLE 31
Method of Making Soft, Lightweight, Flexible, Flame-Resistant Objects To about 21.5 gm of castor oil was added 56.6 gm of polyester resin. These reagents were thoroughly mixed. Next, about 20.5 gm of calcium carbonate (AD grade) was added and mixed thoroughly. About 65.8 gm of 4,4' diphenylmethane diisocyanate, 1.5 gm of dibutyltin dilaurate, 1.5 ml of triethylamine, and 4.2 gm of calcium oxide were added and mixed well. Next, 1 ml of N,N-dimethylaniline, 1 ml of cross-linker (polyethylene glycol 400 dimethacrylate), 1 ml of catalyst (cobalt II naphthanate), and 1 gm of benzoyl peroxide were added and mixed well. The resulting object was soft, lightweight, flexible, flame-resistant and exhibited sufficient low density that it floated in water.

EXAMPLE 32
Method of Making Hard, Lightweight, Flame-Resistant Objects

To about 20.5 gm of castor oil was added 56.6 gm of vinylester resin. These reagents were thoroughly mixed. Next, about 20.2 gm of calcium carbonate (AD grade) was added and mixed thoroughly. About 3.0 gm of benzoyl peroxide mix consisting of 30% benzoyl peroxide in calcium carbonate was added and mixed thoroughly. Next, 65.5 gm of 4,4' diphenylmethane diisocyanate, 1.5 ml of dibutyltin dilaurate, 1.5 ml of triethylamine, and 4.4 gm of calcium oxide were added and mixed well. Next, 1 ml of N,N-dimethylaniline, 1 ml of cross-linker (polyethylene glycol 400 dimethacrylate), and 1 ml of catalyst (cobalt II naphthanate), were added and mixed well. The resulting object was hard, lightweight, flame-resistant and exhibited sufficient low density that it floated in water. In a separate experiment, fiberglass was added to reinforce the object made with this method.

Additional experiments were conducted with the following ranges of reagents: castor oil (25–26 gm); vinylester resin (25–55 gm); calcium carbonate (70–90 gm); benzoyl peroxide mix (3–3.5 gm); calcium oxide (3.6–4.5 gm); 4,4' diphenylmethane diisocyanate (25.1–52.1 gm); dibutyltin dilaurate (0.25–0.75 ml); triethylamine (0.25–0.75 ml); N,N-dimethylaniline (0.25–0.75 ml); cobalt II naphthanate (0.25–0.75 ml); polyethylene glycol 400 dimethacrylate (1 ml); and Solution 2 from Example 16 (0.25–0.75 ml). These experiments all produced hard, lightweight, flame-resistant objects that exhibited sufficient low density that they floated in water. The initiators were added at the end of the order of the addition of reagents, whereas calcium carbonate, benzoyl peroxide mix, and calcium oxide may be added in any order.

TABLE 3

|   |   | 1 | 2 | 3 | 4 | 5 | 6 | 7 | 8 | 9** |
|---|---|---|---|---|---|---|---|---|---|---|
| 1 | Gel Coat | 350 | 350 |  | 350 | 350 | 350 | 350 | 350 | 350 |
| 2 | Hard Surface Resin | 350 | 350 | 350 | 350 | 350 | 350 | 350 | 350 | 350 |
| 3 | CMC sol. (0.5%) | 9 | 50 |  | 50 | 50 | 15 | 25 | 25 | 25 |
| 4 | Polyacrylic acid | 9 | 10 |  | 10 | 10 | 20 | 25 | 25 | 25 |
| 5 | Methylmethacrylate | 17.5 | 20 | 100 | 20 | 20 | 20 |  |  |  |
| 6 | N,N-dimethylaniline | 4.25 | 4.25 | 15 | 7 | 7 | 7 | 7 | 7 | 7 |

TABLE 3-continued

|   | 1 | 2 | 3 | 4 | 5 | 6 | 7 | 8 | 9** |
|---|---|---|---|---|---|---|---|---|---|
| 7 Polyethylene glycol 400 dimethacrylate | 20 | 20 | 30 | 20 | 20 | 8 | 9 | 9 | 9 |
| 8 Mix A* | | | 350 | | | | | | |
| 9 PMMA (30%) in MMA | | | | | | | 100 | 100 | 100 |
| 10 Silica (Colloidal silica in MEKP) | 20 | 20 | 30 | 20 | 20 | 30 | 50 | 50 | 50 |
| 11 Cobalt II naphthanate | 4.25 | 4.25 | 15 | 7 | 7 | 7 | 7 | 7 | 7 |
| 12 Solution 2 | 15 | 15 | 15 | 25 | 25 | 25 | 25 | 20 | 20 |

*Mix A consisted of the following: 500 ml calcium carbonate, 65 ml CMC solution, 350 ml gel coat, 5 ml polyaniline.
**Indicates best sample. All reagents shown in ml. PMMA in MMA is polymethylmethacrylate in methylmethacrylate.

TABLE 4

|   | 1 | 2 | 3 | 4 | 5 | 6 | 7** |
|---|---|---|---|---|---|---|---|
| 1 Vinyl ester resin | 20 | 60 | 60 | 60 | 60 | 60 | 60 |
| 2 CMC sol. (0.5%) | | 2 | 1 | | | 20 | 10 |
| 3 CaCO₃ | | 100 | 100 | 100 | 100 | 100 | 10 |
| 4 Solution 1 | | 20 | 20 | 20 | 10 | | |
| 5 Ethylene glycol | | 10 | | | | | |
| 6 Styrene | | 5 | | | | | |
| 7 Diisocyanate | | | | 3 | 3 | 3 | 3 |
| 8 N,N-dimethylaniline | 0.5 | 3 | 3 | 3 | 3 | 3 | 3 |
| 9 Cobalt II naphthanate | 0.5 | 3 | 3 | 3 | 3 | 3 | 3 |
| 10 Hardener | 0.5 | 3 | 3 | 3 | 3 | 3 | 3 |
| 11 Solution 2 | 0.5 | 3 | 3 | 3 | 3 | 3 | 3 |
| 12 Polyethylene glycol-400 dimethacrylate | | | | 3 | 3 | 3 | 3 |
| Gel Time (minutes) | 4 | 5–6 | 4 | | | | |

All reagents shown in ml. **Indicates best sample.

TABLE 5

|   | 1 | 2 | 3 | 4** |
|---|---|---|---|---|
| 1 Vinyl ester resin | 400 | 400 | 400.01 | 400 |
| 2 Solution of 50 ml polyacrylic acid and CMC and 1.04 g NaOH | | 5 | | |
| 3 Solution 5C | | | 3 | 3.09 |
| 4 Polyethylene glycol 400 dimethacrylate | | | 3 | 2.05 |
| 5 N,N-dimethylaniline | 2 | 1 | 1.02 | 1.01 |
| 6 Distilled methyl methacrylate | | | | 20 |
| 7 Cobalt II naphthanate | 0.5 | 0.5 | 0.71 | 0.64 |
| 8 Solution 2 | 0.5 | 0.65 | 0.6 | 0.64 |

**Indicates best sample. All reagents shown in gm.

TABLE 6

|   | 1 | 2 |
|---|---|---|
| 1 CaCO₃ | 140 | 140 |
| 2 Solution 2 | 14.2 | 14.2 |
| 3 Polyester resin | 35 | 35 |
| 4 Solution 4 | 2.5 | 2.5 |
| 5 Epoxy resin | 35 | 35 |
| 6 Ethylene glycol | 40 | 40 |
| 7 Styrene | | |
| 8 N,N-dimethylaniline | 0.25 | |
| 9 3,5-dimethylaniline | | 0.25 |
| 10 Polyethylene glycol 400 dimethacrylate | 0.25 | 0.25 |

TABLE 6-continued

|   | 1 | 2 |
|---|---|---|
| 11 Cobalt II naphthanate | 0.25 | 0.25 |
| 12 Solution 2 | 0.25 | 0.25 |
| Gel time (minutes) | 0.5 | 0.5 |

All reagents shown in gm.

TABLE 7

|   | 1** | 2 | 3 | 4 | 5 | 6 |
|---|---|---|---|---|---|---|
| 1 Polyester resin | 10 | 10 | 10 | 10 | 10 | 10 |
| 2 Solution 4 | 0.6 | 0.5 | 0.5 | 0.5 | 0.5 | 0.5 |
| 3 Styrene | 5 | 5 | 5 | 5 | | |
| 4 Surfactant E | 5.1 | 5.0 | 7.1 | 7.1 | 7.0 | 7.0 |
| 5 Fly ash (fine) | | 95 | 110 | 110 | 120 | |
| 6 Fly ash (coarse) | | | | | | 120 |
| 7 Sand | 80.2 | | | | | |
| 8 CaCO₃ | 40 | | | | | |
| 9 Solution 1 | 12 | 9.4 | 11 | 22.1 | 25 | 25 |
| 10 N,N-dimethylaniline | 0.5 | 0.5 | 0.5 | 0.5 | 0.75 | 0.75 |
| 11 Cobalt II naphthanate | 0.5 | 0.5 | 0.5 | 0.5 | 0.75 | 0.75 |
| 12 Solution 2 | 0.5 | 0.5 | 0.5 | 0.5 | 0.75 | 0.75 |

**Indicates best sample. All reagents shown in gm.

EXAMPLE 33

Non-flammable pre-polymer in the liquid phase.

The following formulation is for a prepolymer liquid phase that is non-flammable when it is in the prepolymer liquid phase. The prepolymer can then be polymerized for a variety of uses. The hardener in the following formulations is methyl methacrylate and benzoyl peroxide.

Solution A
100 g of ethylene glycol
100 g of maleic anhydride
Heat to approximately 170° C. for approximately 30 minutes.

Solution B
100 g of polyethylene glycol 400
50 g of polyester resin powder (Sunrise Corporation)
Heat to approximately 95° C. for about 30 minutes.

Solution C
15.0 g of low molecular weight polystyrene from Example 14
3.0 g of ethylenediamine Solution D
15 g of styrene monomers
3.0 g of ethylenediamine Solution E
100.0 g of ethylene glycol 100.0 g of maleic anhydride Heat to 170° for 1 hour

EXAMPLE 34

A non-flammable prepolymer solution was prepared from the solutions in Example 33 by mixing 20.0 grams of Solution A with 9.0 grams of Solution C. The resulting mixture was heated to approximately 50° C. to 60° C. for five to ten minutes. 20.0 g of Solution B was then added to the mixture and thoroughly mixed. The resulting prepolymer solution was substantially inflammable. The prepolymer mixture was then polymerized. To the prepolymer mixture, 10 g of $CaCO_3$ (AD), 0.25 g of N,N-dimethyl aniline and 0.25 g of colbalt II naphthanate was added and mixed. To this solution was added 0.20 g of Solution 2 (Example 16) comprising 99% methylethylketone peroxide and 1% hydrogen peroxide. The polymer was then allowed to cure

EXAMPLE 35

A non-flammable prepolymer solution was prepared from the solutions in Example 33 by mixing 20.0 grams of Solution A with 36.0 grams of Solution D. The resulting mixture was heated to approximately 50° C. to 60° C. for five to ten minutes. 20.0 g of Solution B was then added to the mixture and thoroughly mixed. The resulting prepolymer solution was substantially inflammable. The prepolymer mixture was then polymerized. To the prepolymer mixture, 10 g of $CaCO_3$ AD, 0.25 g of N,N dimethyl aniline and 0.25 g of colbalt II naphthanate was added and mixed. To this solution was added .20 g of Solution 2 (Example 16) comprising 99% methylethylketone peroxide and 1% hydrogen peroxide. The polymer was then allowed to cure

EXAMPLE 36

A non-flammable prepolymer solution was prepared from the solutions in Example 33 by mixing 10.0 grams of Solution A with 6.0 grams of styrene. The resulting mixture was heated to approximately 50° C. to 60° C. for five to ten minutes. 10.0 g of Solution B was then added to the mixture and thoroughly mixed. The resulting prepolymer solution was substantially inflammable. The prepolymer mixture was then polymerized. To the prepolymer mixture, 10 g of $CaCO_3$ (AD), 0.25 g of N,N-dimethyl aniline and 0.25 g of colbalt II naphthanate was added and mixed. To this solution was added 0.20 g of Solution 2 (Example 16) comprising 99% methylethylketone peroxide and 1% hydrogen peroxide. The polymer is then allowed to cure.

EXAMPLE 37

A non-flammable prepolymer solution was prepared from the solutions in Example 33 as follows:

Solution MA#1

20.0 g of Solution A 20.0 g of Solution B 6.0 g of ethylene dimethacrylate

Mix and heat to 60° C. for 5 to 10 minutes.

Flash point>212° F.

Solution MA#2

40.0 g of Solution B 6.0 g of ethylene dimethacrylate

Mix and heat to 60° C. for 5 to 10 minutes.

Flash point>212° F.

Solution MA#3

20.0 g of Solution B 6.0 g of ethylene dimethacrylate

Flash point>212° F.

Solution MA#4

20.0 g of Solution E 20.0 g of Solution B 6.0 g of ethylene dimethacrylate

Flash point>212° F.

Solution MA#5

10.0 g of Solution E 20.0 g of Solution B 12.0 g of ethylene dimethacrylate

Flash point>212° F.

Control Solution 20.0 g of Solution A 20.0 g of Solution B

Flash point>212° F.

EXAMPLE 38

Solution MA#1 was a substantially non-flammable prepolymer solution. The prepolymer mixture was then polymerized. To the prepolymer mixture MA#1, 15 g of $CaCO_3$ (AD), 0.25 g of N,N-dimethyl aniline and 0.25 g of colbalt II naphthanate was added and mixed. To this solution was added 0.25 g of Solution 2 (Example 16) comprising 99% methylethylketone peroxide and 1% hydrogen peroxide. [The flash point in all of the Examples is a closed cup flash determination in which an aliquot of material is placed in a sealed vessel. The vessel is equipped with a temperature measuring device such as a thermometer or a thermocouple. The vessel is equipped with an ignition device such as sparker or a glowplug. The ignition device is turned on and the vessel temperature is slowly increased until the vapors from the material in the vessel are ignited. The temperature at the point of ignition is the flash point value.] The flash point of the prepolymer mixture in this example was greater than 212° F. The polymer was then allowed to cure. The control solution had a flash point of greater than 212° F.

EXAMPLE 39

Solution MA#2 was a substantially non-flammable prepolymer solution. The prepolymer mixture was then polymerized. To the prepolymer mixture MA#2, 15 g of $CaCO_3$ (AD), 0.25 g of N,N-dimethyl aniline and 0.25 g of colbalt II naphthanate was added and mixed. To this solution was added 0.25 g of Solution 2 (Example 16) comprising 99% methylethylketone peroxide and 1% hydrogen peroxide. The polymer was then allowed to cure.

EXAMPLE 40

Solution MA#2 was a substantially non-flammable prepolymer solution. The prepolymer mixture was then polymerized. To the prepolymer mixture MA#2, 15.0 g of $CaCO_3$ (AD) and 0.25 g of N,N-dimethyl aniline. To this solution was added 1.0 g of a mixture comprising 20% benzoyl peroxide and 80% gypsum. The polymer was then allowed to cure.

EXAMPLE 41

Solution MA#3 was a substantially non-flammable prepolymer solution. The prepolymer mixture was then polymerized. To the prepolymer mixture MA#3, 14.0 g of $CaCO_3$ (AD) and 0(.1 g of N,N-dimethyl aniline was added and mixed. To this solution was added 1.0 g of a mixture comprising 20% benzoyl peroxide and 80% gypsum. The polymer was then allowed to cure.

EXAMPLE 42

Solution MA#4 was a substantially non-flammable prepolymer solution. The prepolymer mixture was polymerized by adding to the prepolymer mixture MA#4, 14.0 g of $CaCO_3$ (AD) and 0.1 g of N,N-dimethyl aniline. To this solution was added 1.0 g of a mixture comprising 20% benzoyl peroxide and 80% gypsum. The polymer was then allowed to cure.

EXAMPLE 43

The following examples (Examples 39 through 42) show the manufacture of flexible polymers. The prepolymer mixture MA#2 was polymerized by adding to the prepolymer mixture MA#2, 32.2 g of $CaCO_3$ (AD) and 0.12 g of N,N-dimethyl aniline. To this solution was added 1.15 g of a mixture comprising 20% benzoyl peroxide and 80% gypsum. The polymer was then allowed to cure.

EXAMPLE 44

The prepolymer mixture MA#3 was polymerized by adding to the prepolymer mixture MA#3, 36.4 g of $CaCO_3$ (AD) and 0.13 g of N,N-dimethyl aniline. To this solution was added 1.3 g of a mixture comprising 20% benzoyl peroxide and 80% gypsum. The polymer was then allowed to cure.

EXAMPLE 45

The prepolymer mixture MA#4 was polymerized by adding to the prepolymer mixture MA#4, 32.2 g of $CaCO_3$ (AD) and 0.12 g of N,N-dimethyl aniline. To this solution was added 1.15 g of a mixture comprising 20% benzoyl peroxide and 80% gypsum. The polymer was then allowed to cure.

EXAMPLE 46

The prepolymer mixture MA#5 was polymerized by adding to the prepolymer mixture MA#5, 36.4 g of $CaCO_3$ (AD) and 0.13 g of N,N-dimethyl aniline. To this solution was added 1.3 g of a mixture comprising 20% benzoyl peroxide and 80% gypsum. The polymer was then allowed to cure.

EXAMPLE 47

A non-flammable prepolymer resin was prepared by mixing 15 g of Solution B, 6 g of ethylenedimethacrylate (EDM), 6 g of Solution A and 10 g of a polyvinyl alcohol solution. The mixture was split into two equal batches. To one half of the mixture was added 0.25 milliliters of N'N-dimethyl aniline. The mixture gelled while mixing. To the remaining half of the mixture was added 0.25 milliliters of N'N-dimethyl aniline and 1.5 milliliters of a 5 wt. % borax solution in water. The mixture gelled while mixing.

EXAMPLE 48

A non-flammable prepolymer resin was prepared by mixing 15 g of Solution A, 3.6 g of a PVA/CMC solution (50 wt % of a solution of 10 wt % PVA in $H_2O$ and 50 wt % of a solution of 0.25 wt % CMC in $H_2O$) and 15 g of Solution B. Heat was applied.

EXAMPLE 49

A non-flammable prepolymer resin was prepared by mixing 15 g of Solution B, 6 g of ethylene glycol dimethylacrylate (EGD), and 15 g of Solution A. Heat was applied. The mixture was split into two equal batches.

To the first batch mixture was added 0.25 milliliters of cobalt II naphthanate, 0.25 milliliters of N'N-dimethyl aniline, 0.25 milliliters of Solution 2 (Example 16) and 5 g of calcium carbonate ($CaCO_3$). The mixture gelled in about 3 minutes.

To the second batch mixture was added 0.25 milliliters of cobalt II naphthanate, 0.25 milliliters of N'N-dimethyl aniline and 0.25 milliliters of Solution 2. The mixture gelled in about 3 minutes.

EXAMPLE 50

A non-flammable prepolymer resin was prepared by mixing 15 g of Solution B, 6 g of polyethylene glycol dimethylacrylate (PEGDAM) and 15 g of Solution A. Heat was applied. The mixture was split into two equal batches.

To the first batch of mixture was added 5 g of $CaCO_3$, 0.25 milliliters of cobalt II naphthanate, 0.25 milliliters of N'N-dimethyl aniline and 0.25 milliliters of Solution 2 (Example 16). The mixture gelled in about 2 minutes.

To the second batch of mixture was added 3 g of EGD, 0.25 milliliters of cobalt II naphthanate, 0.25 milliliters of N'N-dimethyl aniline, 0.25 milliliters of Solution 2 (Example 16) and 5 g of $CaCO_3$. The mixture gelled in about 1 minute.

EXAMPLE 51

A non-flammable prepolymer resin was prepared by mixing 15 g of Solution B, 6 g of diethylene glycol and 15 g of Solution A. Heat was applied. The mixture gelled in about 3 minutes.

EXAMPLE 52

A non-flammable prepolymer resin was prepared by mixing 15 g of Solution B, 6 g of PEG-400-DMA and 15 g of Solution A. Heat was applied. The mixture was split into two equal batches.

To the first batch mixture was added 5 g of EGD, 5 g of $CaCO_3$, 0.25 milliliters of cobalt II naphthanate, 0.25 milliliters of N'N-dimethyl aniline and 0.25 milliliters of Solution 2 (Example 16). The mixture gelled in about 1 minute.

To the second batch mixture was added 5 g of EGD, 0.6 g of pentaerythritol tetraacrylate (PENTA) cross-linker, 0.25 milliliters of cobalt II naphthanate, 0.25 milliliters N'N-dimethyl aniline, 0.25 milliliters of Solution 2 (Example 16) and 5 g of $CaCO_3$. The mixture gelled in about 1 minute.

EXAMPLE 53

A non-flammable prepolymer resin was prepared by mixing 15 g of Solution B, 6 g of DEG, and 15 g of Solution A. Heat was applied. The mixture was split into two equal batches.

To the first batch mixture was added 5 g of EGD, 5 g of $CaCO_3$, 0.25 milliliters of cobalt II naphthanate, 0.25 milliliters of N'N-dimethyl aniline and 0.25 milliliters of Solution 2 (Example 16). The mixture gelled in about 2 minutes.

To the second batch mixture was added 5 g of EGD, 0.6 g of PENTA cross-linker, 5 g of $CaCO_3$, 0.25 milliliters of cobalt II naphthanate, 0.25 milliliters of N'N-dimethyl aniline and 0.25 milliliters of Solution 2 (Example 16). The mixture gelled in about 2 minutes.

EXAMPLE 54

A non-flammable prepolymer resin was prepared by mixing 15 g of Solution B, 6 g of diallyl phthalate and 15 g of Solution A. Heat was applied. The mixture was split into two equal batches.

To the first batch mixture was added 5 g of EGD, 5 g of CaCO$_3$, 0.25 milliliters of cobalt II naphthanate, 0.25 milliliters N'N-dimethyl aniline and 0.25 milliliters of Solution 2 (Example 16). The mixture gelled in about 2 minutes.

To the second batch mixture was added 5 g of EGD, 0.6 g of PENTA cross-linker, 5 g of CaCO$_3$, 0.25 milliliters of cobalt II naphthanate, 0.25 milliliters N'N-dimethyl aniline and 0.25 milliliters of Solution 2 (Example 16). The mixture gelled in about 2 minutes.

EXAMPLE 55

Preparation of "In-House" Polyester Resin

A polyester resin was prepared by the following procedure. The following reactants were added to a three-neck reaction flask: 152.2 g (2.0 moles) of propylene glycol, 70.0 g (0.6 mole) of fumaric acid, 39.12 g (0.4 moles) of maleic anhydride and 148.12 g (1.0 mole) of phthalic anhydride. The three necked flask was fitted with a thermometer, a nitrogen gas input and a vacuum pump. The reaction flask was purged with N$_2$ and heated slowly until the temperature reached about 80 to 90° C. The reaction mixture was heated to a temperature of about 180 to 190° C. and maintained at this temperature for about 6 hours. In order to prevent the loss of propylene glycol and phthalic and hydride (B.P. 187° C. and 140° C. respectively) from the reaction mixture, vacuuming to remove water was initiated about 3 hours after starting the reaction. This resulted in an equilibrium shift in the reaction in the direction towards producing a high molecular weight polyester.

In order to further prevent the loss of propylene glycol and phthalic and hydride, a Dean-Stark trap and water-cooled condenser was used in combination with the vacuum pump. This allowed polypropylene glycol and phthalic and hydride vapors to condensate at the bottom of the condenser and flow back into the reaction flask. In a separate trial, the amount of propylene glycol added to the reaction vessel was increased by about 5 wt. % in order to offset any loss of propylene glycol due to loss of propylene glycol monomer.

After about 6 hours at a temperature of about 182–193° C. the reaction mixture was reduced to a temperature of 140° C. and maintained at this temperature for approximately 30 minutes. The reaction mixture was then cooled to room temperature and removed from the reaction flask into a collection flask. The reaction produced approximately 10 to 15 milliliters of material, about 90 g of resin. The resin material was mixed with a 35% by weight solution of styrene in hydroquinone (50 g of styrene treated with 0.015 g of hydroquinone). This resin mixture was labeled as our standard castable formulation.

EXAMPLE 56

Three solutions, C-1, D-1 and F-1, were produced as follows.

Solution C-1

Solution C-1 was prepared by mixing 100 g of PEG-400 and 100 g of maleic anhydride. The mixture was heated to approximately 175° C. for about 1 hour.

Solution D-1

Solution D-1 was prepared by mixing 100 g of ethylene glycol and 100 g of fumaric acid. The mixture was heated to approximately 170° C. for about 30 minutes.

Solution F-1

Solution F-1 was prepared by mixing 100 g of "the polyester resin from Example 55" and 100 g of PEG-400. The mixture was heated until the polyester resin dissolved in the PEG-400.

EXAMPLE 57

A non-flammable prepolymer resin was prepared by mixing 15 g of Solution B, 6 g of PEG-400-DMA, and 15 g of Solution C-1. Heat was applied. The mixture was split into two equal batches.

To the first batch mixture was added 5 g of EGD, 0.6 g of PENTA cross-linker, 3 g of PEG-400-DMA, 5 g of calcium carbonate, 0.25 milliliters of cobalt II naphthanate, 0.25 milliliters of N'N-dimethyl aniline, and 0.25 milliliters of Solution 2 (Example 16). The mixture gelled in about I minute.

To the second batch mixture was added 5 g of EGD, 0.6 g of PENTA cross-linker, 5 g of calcium carbonate, 0.25 milliliters of cobalt II naphthanate, 0.25 milliliters of N'N-dimethyl aniline and 0.25 milliliters of Solution 2 (Example 16). The mixture gelled in about 1 minute.

EXAMPLE 58

A non-flammable prepolymer resin was prepared by mixing 15 g of Solution A, 6 g of PEG-400-DMA and 15 g of solution D-1. The above mixture was split into two equal batches.

To the first batch mixture was added 5 g of EGD, 0.7 g of PENTA cross-linker, 5 g of calcium carbonate, 0.25 milliliters of cobalt II naphthanate, 0.25 milliliters of N'N-dimethyl aniline, and 0.25 milliliters of Solution 2 (Example 16). The mixture gelled in about 1 minute.

To the second batch mixture was added 3 g of PEG-400-DMA, 15 g of Solution B, 10 g of EGD, 1.3 g of PENTA cross-linker, 10 g of calcium carbonate, 0.5 milliliters of cobalt II naphthanate, 0.5 milliliters of N'methyl aniline, and 0.5 milliliters of Solution 2 (Example 16). The mixture gelled in about 1 minute.

EXAMPLE 59

A non-flammable prepolymer resin was prepared by mixing 15 g of Solution A, 15 g of Solution D-1, 6 g of PEG-400-DMA, 10 g of EGD and 1.3 g of PENTA cross-linker. The above mixture was split into two equal batches.

To the first batch mixture was added 0.6 g of CaO, 5 g of calcium carbonate, 0.125 milliliters of cobalt II naphthanate, 0.125 milliliters of N'N-dimethyl aniline and 0.125 milliliters of Solution 2 (Example 16). The mixture gelled in about 3 minutes.

EXAMPLE 60

A non-flammable prepolymer polyester resin was prepared by mixing 15 g of Solution D-1, 3 g of PEG-400-DMA, 5 g of EGD, 0.7 g of PENTA cross-linker, 5 g of calcium carbonate, 0.25 milliliters of cobalt II naphthanate, 0.25 milliliters of N'N-dimethyl aniline and 0.25 milliliters of Solution 2 (Example 16). The mixture gelled in about 2 minutes.

EXAMPLE 61

A non-flammable resin was prepared by mixing 60 g of Solution D-1, 10 g of epoxy resin, 13 g of PEG-400, 21.1 g of EGD, 3 g of PENTA cross-linker, 5 g of calcium carbonate, 0.25 milliliters of cobalt II naphthanate, 0.25 milliliters of N'N-dimethyl aniline and 0.25 milliliters of Solution 2 (Example 16). The mixture gelled in about 1 minute.

EXAMPLE 62

A resin was prepared by mixing 150 g of a polyester resin, 200 g of epoxy resin, 5 milliliters of a 0.25 wt. % carboxymethyl cellulose solution, 350 g of aluminum trihydride, 10 g of benzyl peroxide, 35 milliliters of Solution 1, 50 g of a 5% wt. solution of polymethyl methacrylate in methyl methacrylate (PMMA in MMA), 50 g of ethylene glycol, 3 g of PENTA cross-linker, 3 milliliters of N'N-dimethyl aniline, 3 milliliters of cobalt II naphthanate, and 3 milliliters of Solution 2 (Example 16). The mixture gelled in 5 minutes.

EXAMPLE 63

A non-flammable polyester resin was prepared by mixing 15 g of Solution D-1, 3 g of PEG-400-DMA, 5 g of EGD, 0.7 g of PENTA cross-linker, 0.1 g of 4,4'-diaminodiphenyl methane, 5 g of calcium carbonate and 10.5 g of a stock solution of 1 g benzoyl peroxide mixed with 20 g of PEG-400. The mixture gelled in about 6 minutes.

EXAMPLE 64

A non-flammable polyester resin was prepared by mixing 15 g of Solution D-1, 3 g of PEG-400-DMA, 5 g of EGD, 0.7 g of PENTA cross-linker, 0.3 g of 4,4'-diaminodiphenyl methane, 5 g of calcium carbonate, and 0.5 g of the stock solution of Example 63. The mixture gelled in about 6 minutes.

EXAMPLE 65

A non-flammable polyester resin was prepared by mixing 15 g of Solution D-1, 0.4 g of tetraetinylene glycol (TEG), 3 g of PEG-400-DMA, 5 g of EGD, 0.7 g of PENTA cross-linker, 0.2 g of 4,4'-diaminodiphenyl methane, 5 g of $CaCO_3$ and 10.5 g of stock solution (Example 63). The mixture gelled in about 4 minutes.

EXAMPLE 66

A non-flammable polyester resin was prepared by mixing 15 g of Solution D-1, 3 g of PEG-400-DMA, 5 g of EGD, 0.7 g of PENTA cross-linker, 0.2 g of 4,4'-diaminodiphenyl methane, 20 g of $CaCO_3$ and 10.5 g of stock solution (Example 63). The mixture gelled in about 4 minutes.

EXAMPLE 67

A non-flammable polyester resin was prepared by mixing 50 g of Solution D-1, 10 g of EGD, 5 g of 4,4'-diaminodiphenyl methane, 20 g of $CaCO_3$ and 20 g of benzyl peroxide. The mixture gelled in about 4 minutes.

EXAMPLE 68

A non-flammable polyester resin was prepared by mixing 45 g of Solution F-1, 9 g of PEG-400-DMA, 15 g of EGD, 2.1 g of PENTA cross-linker, 15 g of $CaCO_3$, 0.6 g of 4,4'-diaminodiphenyl methane and 1.5 g of stock solution (Example 63). The mixture gelled in about 4 minutes.

EXAMPLE 69

A non-flammable polyester resin was prepared by mixing 50 g of Solution F-1, 10 g of EGD, 5 g of 4,4'-diaminodiphenyl methane, 20 g of $CaCO_3$ and 20 g of stock solution (Example 63). The mixture gelled in about 5 minutes.

EXAMPLE 70

A non-flammable polyester resin was prepared by mixing 50 g of Solution F-1, 10 g of EGD, 5 g of 4,4'-diaminodiphenyl methane, 20 g of $CaCO_3$ and 20 g of stock solution (Example 63). The reactants were mechanically mixed in a blender. The mixture gelled in about 2 minutes.

EXAMPLE 71

A non-flammable polyester resin was prepared by mixing 45 g of Solution F-1, 9 g of PEG-400-DMA, 1.5 g of EGD, 2.1 g of PENTA cross-linker, 45 g of $CaCO_3$, 1.2 g of 4,4'-diaminodiphenyl methane and 3 g of stock solution (Example 63). The reactants were mechanically mixed in a blender. The mixture gelled in about 2 minutes.

EXAMPLE 72

A non-flammable polyester resin was prepared by mixing 45 g of Solution F-1, 9 g of PEG-400-DMA, 15 g of EGD, 2.1 g of PENTA cross-linker, 60 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 73

A non-flammable polyester resin was prepared by mixing 45 g of Solution F-1, 9 g of PEG-400-DMA, 15 g of EGD, 2.1 g of PENTA cross-linker, 75 g of $CaCO_3$, 1.2 g of 4,4'-diaminodiphenyl methane and 3 g of stock solution (Example 63). The reactants were mechanically mixed in a blender. The mixture gelled in about ½ minutes.

EXAMPLE 74

A non-flammable polyester resin was prepared by mixing 22.5 g of Solution F-1, 22.5 g of Solution D-1, 9 g of PEG-400-DMA, 15 g of EGD, 2.1 g of PENTA cross-linker, 75 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 75

A non-flammable polyester resin was prepared by mixing 22.5 g of Solution F-1, 22.5 g of Solution D-1, 9 g of PEG-400-DMA, 15 g of EGD, 75 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 76

A non-flammable polyester resin was prepared by mixing 45 g of Solution F-1, 9 g of PEG-400-DMA, 15 g of EGD, 75 g of $CaCO_3$, 1.2 g of 4,4'-diaminodiphenyl methane and 3 g of stock solution (Example 63). The reactants were mechanically mixed in a blender. The mixture gelled in about ½ minutes.

EXAMPLE 77

A non-flammable polyester resin was prepared by mixing 45 g of Solution F-1,15 g of EGD, 75 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 78

A non-flammable polyester resin was prepared by mixing 45 g of Solution F-1, 9 g of PEG-400-DMA, 75 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 79

A non-flammable resin was prepared by mixing 6.4 epoxy resin, 38.6 g of Solution F-1, 9 g of PEG-400-DMA, 15 g of EGD, 75 g of $CaCO_3$, 2.1 g of 4,4'-diaminodiphenyl methane and 3 g of stock solution (Example 63). The reactants were mechanically mixed in a blender. The mixture gelled in about 1 minute.

EXAMPLE 80

A non-flammable resin was prepared by mixing 22.5 g of Solution D-1, 22.5 g of Solution F-1, 9 g of PEG-400-DMA, 75 g of $CaCO_3$, 1.2 g of 4,4'-diaminodiphenyl methane and 3 g of stock solution (Example 63). The reactants were mechanically mixed in a blender. The mixture gelled in about 1 minute.

EXAMPLE 81

A non-flammable resin was prepared by mixing 45 g of Solution F-1, 9 g of PEG-400-DMA, 15 g of EGD, 75 g of $CaCO_3$, 1.2 g of 4,4'-diaminodiphenyl methane and 3 g of stock solution (Example 63) and 0.5 g of Surfactant D (Example 16). The reactants were mechanically mixed in a blender. The mixture gelled in about 1 minute.

EXAMPLE 82

A non-flammable resin was prepared by mixing 45 g of Solution F-1, 9 g of PEG-400-DMA, 15 g of EGD, 85 g of $CaCO_3$, 1.2 g of 4,4'-diaminodiphenyl methane, 3 g of stock solution (Example 63) and 0.5 g of Surfactant D (Example 16). The reactants were mechanically mixed in a blender. The mixture gelled in about ½ minute.

EXAMPLE 83

A non-flammable resin was prepared by mixing 45 g of Solution F-1, 9 g of PEG-400-DMA, 15 g of EGD, 95 g of $CaCO_3$, 1.2 g of 4,4'-diaminodiphenyl methane and 3 g of stock solution (Example 63) and 0.5 g of Surfactant D (Example 16). The reactants were mechanically mixed in a blender. The mixture gelled in about ½ minute.

EXAMPLE 84

A non-flammable resin was prepared by mixing 47.6 g of Solution F-1, 7.5 g of EGD, 79.3 g of $CaCO_3$, 1.3 g of 4,4'-diaminodiphenyl methane and 3.2 g of stock solution (Example 63). The reactants were mechanically mixed in a blender. The mixture gelled in about ½ minute.

EXAMPLE 85

A non-flammable resin was prepared by mixing 52.5 g of Solution F-1, 7.5 g of EGD, 75 g of $CaCO_3$, 1.2 g of 4,4'-diaminodiphenyl methane and 3.2 g of stock solution (Example 63). The reactants were mechanically mixed in a blender. The mixture gelled in about ½ minute.

EXAMPLE 86

A non-flammable resin was prepared by mixing 52.5 g of Solution F-1, 7.5 g of EGD, 75 g of $CaCO_3$, 1.2 g of 4,4'-diaminodiphenyl methane and 3.2 g of stock solution (Example 63). The reactants were mechanically mixed in a blender. The mixture gelled in about ½ minute.

EXAMPLE 87

A non-flammable resin was prepared by mixing 52.5 g of Solution F-1, 7.5 g of EGD, 75 g of $CaCO_3$, 1.2 g of 4,4'-diaminodiphenyl methane and 3.2 g of stock solution (Example 63) and 0.47 g of Surfactant D (Example 16). The reactants were mechanically mixed in a blender. The mixture gelled in about ½ minute.

EXAMPLE 88

A non-flammable resin was prepared by mixing 52.5 g of Solution F-1, 3.7 g of EGD, 3.7 g of PEG-400-DMA, 75 g of $CaCO_3$, 1.2 g of 4,4'-diaminodiphenyl methane and 3 g of stock solution (Example 63) and 0.47 g of Surfactant D (Example 16). The reactants were mechanically mixed in a blender. The mixture gelled in about 2 minutes.

EXAMPLE 89

A non-flammable resin was prepared by mixing 45 g of Solution F-1, 15 g of diallyl phthalate, 75 g of $CaCO_3$, 1.2 g of 4,4'-diaminodiphenyl methane and 3 g of stock solution (Example 63). The reactants were mechanically mixed in a blender. The mixture gelled in about 2 minutes.

EXAMPLE 90

A non-flammable resin was prepared by mixing 45 g of Solution F-1, 15 g of diethylene glycol, 75 g of $CaCO_3$, 1.2 g of 4,4'-diaminodiphenyl methane and 3 g of stock solution (Example 63). The reactants were mechanically mixed in a blender. The mixture gelled in about 2 minutes.

EXAMPLE 91

A non-flammable resin was prepared by mixing 45 g of Solution F-1, 15 g of diethylene glycol, 85 g of $CaCO_3$, 1.2 g of 4,4'-diaminodiphenyl methane and 3 g of stock solution (Example 63). The reactants were mechanically mixed in a blender. The mixture gelled in about 2 minutes.

EXAMPLE 92

A non-flammable resin was prepared by mixing 45 g of the polyester resin of Example 55, 1.2 g of 4,4'-diaminodiphenyl methane, 15 g of diethylene glycol, 8.5 g of $CaCO_3$, 3 g of stock solution (Example 63) and 75 g of sand. The reactants were mechanically mixed in a blender. The mixture gelled in about 2 minutes.

EXAMPLE 93

A non-flammable resin was prepared by mixing 45 g of the polyester resin of Example 55, 1.2 g of 4,4'-diaminodiphenyl methane, 15 g of diethylene glycol, 8.5 g of $CaCO_3$, 3 g of stock solution (Example 63) and 90 g of sand. The reactants were mechanically mixed in a blender. The mixture gelled in about 2 minutes.

EXAMPLE 94

A non-flammable resin was prepared by mixing 45 g of the polyester resin of Example 55, 1.2 g of 4,4'- diaminodiphenyl methane, 15 g of diethylene glycol, 8.5 g of $CaCO_3$, 3 g of stock solution (Example 63) and 100 g of sand. The reactants were mechanically mixed in a blender. The mixture gelled in about 2 minutes.

EXAMPLE 95

A non-flammable resin was prepared by mixing 45 g of the polyester resin of Example 55, 1.2 g of 4,4'-diaminodiphenyl methane, 15 g of diethylene glycol, 12 g of $CaCO_3$, 3 g of stock solution (Example 63) and 107 g of sand. The reactants were mechanically mixed in a blender. The mixture gelled in about 2 minutes.

EXAMPLE 96

A non-flammable resin was prepared by mixing 45 g of the polyester resin of Example 55, 1.2 g of 4,4'-diaminodiphenyl methane, 15 g of diethylene glycol, 12.9 g of $CaCO_3$, 3 g of stock solution (Example 63) and 116 g of sand. The reactants were mechanically mixed in a blender. The mixture gelled in about 2 minutes.

EXAMPLE 97

A non-flammable resin was prepared by mixing 45 g of the polyester resin of Example 55, 1.2 g of 4,4'-diaminodiphenyl methane, 15 g of diethylene glycol, 13.9 g of $CaCO_3$, 3 g of stock solution (Example 63) and 125 g of sand. The reactants were mechanically mixed in a blender. The mixture gelled in about 2 minutes.

EXAMPLE 98

A non-flammable resin was prepared by mixing 45 g of the polyester resin of Example 55, 1.2 g of 4,4'-diaminodiphenyl methane, 15 g of diethylene glycol, 14.9 g of $CaCO_3$, 3 g of stock solution (Example 63) and 134 g of sand. The reactants were mechanically mixed in a blender. The mixture gelled in about 2 minutes.

EXAMPLE 99

A non-flammable resin was prepared by mixing 45 g of the polyester resin of Example 55, 1.2 g of 4,4'-diaminodiphenyl methane, 15 g of diethylene glycol, 15 g of $CaCO_3$, 3 g of stock solution (Example 63) and 144 g of sand. The reactants were mechanically mixed in a blender. The mixture gelled in about 2 minutes.

It should be understood, of course, that the foregoing relates only to preferred embodiments of the present invention and that numerous modifications or alterations may be made therein without departing from the spirit and the scope of the invention.

What is claimed is:

1. A composition consisting essentially of:
   castor oil, linseed oil, or a combination thereof;
   dibutyltin dilaurate;
   diphenylmethane diisocyanate;
   at least one molecular sieve;
   calcium carbonate, calcium oxide, sand, or a combination thereof; and
   a surfactant.

2. The composition of claim 1, wherein the composition consists essentially of:
   a combination of castor oil and linseed oil;
   dibutyltin dilaurate;
   diphenylmethane diisocyanate;
   at least one molecular sieve;
   calcium carbonates calcium oxide, sand, or a combination thereof; and
   a surfactant.

3. The composition of claim 2, wherein the composition consists essentially of:
   a combination of castor oil and linseed oil;
   dibutyltin dilaurate;
   diphenylmethane diisocyanate;
   at least one molecular sieve;
   a combination of calcium carbonate and sand; and
   a surfactant.

4. A composition consisting essentially of:
   a combination of castor oil and linseed oil;
   dibutyltin dilaurate;
   diphenylmethane diisocyanate;
   at least one molecular sieve;
   calcium carbonate, calcium oxide, sand, or a combination thereof; and
   a surfactant.

5. A composition consisting essentially of:
   a combination of castor oil and linseed oil;
   dibutyltin dilaurate;
   diphenylmethane diisocyanate;
   at least one molecular sieve;
   a combination of calcium carbonate and sand; and
   a surfactant.

6. A composition consisting of:
   castor oil, linseed oil, or a combination thereof;
   dibutyltin dilaurate;
   diphenylmethane diisocyanate;
   at least one molecular sieve;
   calcium carbonate, calcium oxide, sand, or a combination thereof; and
   a surfactant.

7. The composition of claim 6 wherein the composition consists of;
   a combination of castor oil and linseed oil;
   dibutyltin dilaurate;
   diphenylmethane diisocyanate;
   at least one molecular sieve;
   calcium carbonate, calcium oxide, sand, or a combination thereof; and
   a surfactant.

8. The composition of claim 6, wherein the composition consists of:
   a combination of castor oil and linseed oil;
   dibutyltin dilaurate;
   diphenylmethane diisocyanate;
   at least one molecular sieve;
   a combination of calcium carbonate and sand; and
   a surfactant.

9. A composition consisting of:
   a combination of castor oil and linseed oil;
   dibutyltin dilaurate;
   diphenylmethane diisocyanate;
   at least one molecular sieve;
   calcium carbonate, calcium oxide, sand, or a combination thereof; and a surfactant.

10. A composition consisting of:
a combination of castor oil and linseed oil;
dibutyltin dilaurate;
diphenylmethane diisocyanate;

at least one molecular sieve.
a combination of calcium carbonate and sand; and
a surfactant.

* * * * *